United States Patent
Hu et al.

(10) Patent No.: US 12,360,331 B2
(45) Date of Patent: *Jul. 15, 2025

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Chen-Hsien Fan, Taoyuan (TW);
Chih-Wen Chiang, Taoyuan (TW);
Chien-Yu Kao, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 43 days.

This patent is subject to a terminal disclaimer.

(21) Appl. No.: 18/481,455

(22) Filed: Oct. 5, 2023

(65) Prior Publication Data
US 2024/0111125 A1    Apr. 4, 2024

Related U.S. Application Data

(63) Continuation of application No. 17/406,605, filed on Aug. 19, 2021, now Pat. No. 11,815,736.

(Continued)

(51) Int. Cl.
*G02B 7/10* (2021.01)
*G02B 7/02* (2021.01)
(Continued)

(52) U.S. Cl.
CPC ............. *G02B 7/10* (2013.01); *G02B 7/025* (2013.01); *G02B 7/09* (2013.01); *G02B 27/646* (2013.01);
(Continued)

(58) Field of Classification Search
CPC . G02B 7/09; G02B 7/005; G02B 7/04; G02B 7/10; G02B 27/64; G02B 27/646; G02B 13/001; G02B 7/023; G02B 7/08; G03B 5/00; G03B 5/02; G03B 13/34; G03B 13/36; G03B 13/32; G03B 2205/0069; G03B 2205/0015; G03B 2205/0007;
(Continued)

(56) References Cited

U.S. PATENT DOCUMENTS 5,905,255 A    5/1999  Wakabayashi et al.
2020/0249415 A1*   8/2020  Wang ...................... G03B 5/00
(Continued)

FOREIGN PATENT DOCUMENTS

CN          112882315 A     6/2021

OTHER PUBLICATIONS

Office Action of CN Application No. 202122154152.5 dated Feb. 22, 2022, 2 pages.

*Primary Examiner* — Marin Pichler
(74) *Attorney, Agent, or Firm* — MUNCY, GEISSLER, OLDS & LOWE, P.C.

(57) ABSTRACT

An optical element driving mechanism is provided and includes a fixed assembly, a first movable assembly and a first driving assembly. The first movable assembly is configured to connect a first optical element, and the first movable assembly is movable relative to the fixed assembly. The first driving assembly is configured to drive the first movable assembly to move relative to the fixed assembly in a first dimension.

19 Claims, 25 Drawing Sheets

Related U.S. Application Data

(60) Provisional application No. 63/078,641, filed on Sep. 15, 2020.

(51) Int. Cl.
*G02B 7/09* (2021.01)
*G02B 27/64* (2006.01)
*G03B 5/02* (2021.01)
*H02K 41/035* (2006.01)

(52) U.S. Cl.
CPC ........ *G03B 5/02* (2013.01); *G03B 2205/0046* (2013.01); *G03B 2205/0069* (2013.01); *H02K 41/0356* (2013.01)

(58) Field of Classification Search
CPC .. G03B 2205/0046; G03B 19/22; G03B 3/10; G03B 17/02; H04N 5/2328; H04N 5/2253; H04N 5/2254; H05K 1/18; H02K 41/0354; H02K 41/0356
USPC ....... 359/359, 822, 823, 824, 694, 696, 813, 359/396, 89; 396/359, 822, 823, 824, 396/694, 696, 813, 396, 89
See application file for complete search history.

(56) References Cited

U.S. PATENT DOCUMENTS

| | | | |
|---|---|---|---|
| 2021/0231904 A1* | 7/2021 | Son | G03B 3/10 |
| 2021/0389551 A1* | 12/2021 | Jang | G03B 5/04 |
| 2022/0244485 A1* | 8/2022 | Jeong | G03B 3/10 |

* cited by examiner

OPTICAL ELEMENT DRIVING MECHANISM

CROSS REFERENCE TO RELATED APPLICATIONS

This application is a Continuation of application Ser. No. 17/406,605, filed on Aug. 19, 2021, which claims the benefit of U.S. Provisional Application No. 63/078,641, filed on Sep. 15, 2020, the entirety of which are incorporated by reference herein.

BACKGROUND OF THE DISCLOSURE

Field of the Disclosure

The present disclosure relates to an optical element driving mechanism, and in particular it relates to an optical element driving mechanism having optical zoom function.

Description of the Related Art

As technology has developed, many of today's electronic devices (such as smartphones) have a camera or video functionality. Using the camera modules disposed on electronic devices, users can operate their electronic devices to capture photographs and record videos.

Today's design of electronic devices continues to follow the trend of miniaturization, meaning that the various components of the camera module or its structure must also be continuously reduced, so as to achieve miniaturization. In general, a driving mechanism in the camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of the users.

Therefore, how to design a camera module capable of being disposed on the front side or the rear side of an electronic device and capable of achieving miniaturization are topics nowadays that need to be discussed and solved.

BRIEF SUMMARY OF THE DISCLOSURE

Accordingly, one objective of the present disclosure is to provide an optical element driving mechanism to solve the problems described above.

According to some embodiments of the disclosure, an optical element driving mechanism is provided and includes a fixed assembly, a first movable assembly and a first driving assembly. The first movable assembly is configured to connect a first optical element, and the first movable assembly is movable relative to the fixed assembly. The first driving assembly is configured to drive the first movable assembly to move relative to the fixed assembly in a first dimension.

According to some embodiments, the first driving assembly includes: a first coil; a first permeability element, corresponding to the first coil; a first magnetic element, corresponding to the first coil and configured to generate a first driving force, wherein the first magnetic element has a first surface which faces the first coil; a first magnetic-enhancing element, corresponding to the first magnetic element and configured to adjust the magnetic field of the first magnetic element; and a first fixed element, fixedly connected to the first permeability element; the first permeability element has a metal material; the first coil is wound around the first permeability element; the first magnetic-enhancing element is fixedly connected to the first magnetic element; the first fixed element has a plastic material; when viewed in a first direction parallel to the first surface, at least a part of the first coil is located between the first magnetic element and the first permeability element; when viewed in the first direction, at least a part of the first fixed element is located between the first permeability element and the first coil; when viewed in the first direction, at least a part of the first fixed element is located between the first permeability element and the first magnetic element.

According to some embodiments, the optical element driving mechanism further includes a second movable assembly configured to be connected to a second optical element, and the second movable assembly is movable relative to the fixed assembly; the first optical element includes a lens; the second optical element includes a lens; the second movable assembly is movable relative to the first movable assembly; the optical element driving mechanism further includes a second driving assembly configured to drive the second movable assembly to move relative to the fixed assembly; the second driving assembly is configured to drive the second movable assembly to move in a second dimension relative to the first movable assembly; the second driving assembly includes: a second coil; a second permeability element, corresponding to the second coil; a second magnetic element, corresponding to the second coil and configured to generate a second driving force, wherein the second magnetic element has a second surface which faces the second coil; a second magnetic-enhancing element, corresponding to the second magnetic element and configured to adjust the magnetic field of the second magnetic element; and a second fixed element, fixedly connected to the second permeability element; the second magnetic-enhancing element is fixedly connected to the second magnetic element; the second permeability element has a metal material; the second coil is wound around the second permeability element; the second fixed element has a plastic material; when viewed in a second direction parallel to the second surface, at least a part of the second coil is located between the second magnetic element and the second permeability element; when viewed in the second direction, at least a part of the second fixed element is located between the second permeability element and the second coil; when viewed in the second direction, at least a part of the second fixed element is located between the second permeability element and the second magnetic element.

According to some embodiments, the first movable assembly is movable relative to the fixed assembly in the first dimension within a first extreme range; the second movable assembly is movable relative to the fixed assembly in the first dimension within a second extreme range; the first extreme range is different from the second extreme range; the first extreme range is smaller than the second extreme range; movement in the first dimension is a linear movement in the first direction; movement in the second dimension is a linear movement in the second direction; the first direction is parallel to the second direction; in a third direction perpendicular to the first surface, minimum sizes of the first permeability element and the second permeability element are different; in the third direction, the minimum size of the first permeability element is greater than the minimum size of the second permeability element; a shortest distance between the first magnetic element and the first coil is different from a shortest distance between the second magnetic element and the second coil; the shortest distance between the first magnetic element and the first coil is shorter than the shortest distance between the second magnetic element and the second coil; in the third direction, a maximum size of the first magnetic element is different from a maximum size of the second magnetic element; in the third direction, the maximum size of the first magnetic element is greater than the maximum size of the second magnetic element; in the first direction, a maximum size of the first magnetic element is different from a maximum size of the second magnetic element; in the first direction, the maximum size of the first magnetic element is less than the maximum size of the second magnetic element; when viewed in the first direction, a surface of the first permeability element perpendicular to the third direction overlaps at least a part of the second permeability element; the first fixed element and the second fixed element form a fixed member; the second fixed element and the first fixed element have an integrally formed structure; in the first direction, a first end portion of the fixed member having a long strip-shaped structure is not in contact with the fixed assembly; in the first direction, a second end portion of the fixed member is not in contact with the fixed assembly, and the first end portion and the second end portion are arranged along the first direction; the fixed member includes: a first fixed surface, located at the first end portion and perpendicular to the first direction; a second fixed surface, located at the first end portion and parallel to the first surface; a third fixed surface, located at the first end portion, wherein the third fixed surface and the second fixed surface face in opposite directions; a fourth fixed surface, located at the first end portion and perpendicular to the first fixed surface and the second fixed surface; a fifth fixed surface, wherein the fifth fixed surface and the first fixed surface face in opposite directions; a sixth fixed surface, located at the second end portion and perpendicular to the first direction; and a seventh fixed surface, wherein the seventh fixed surface and the sixth fixed surface face in opposite directions; the first fixed surface is located at the first fixed element; the second fixed surface is located at the first fixed element; the third fixed surface is located at the first permeability element; the fourth fixed surface is located at the first fixed element; the fifth fixed surface is located at the first fixed element; the sixth fixed surface is located at the second fixed element; the seventh fixed surface is located at the second fixed element; in the first direction, a shortest distance between the first fixed surface and the fixed assembly is less than a shortest distance between the fifth fixed surface and the fixed assembly; in a direction perpendicular to the second fixed surface, a shortest distance between the second fixed surface and the fixed assembly is greater than a shortest distance between the third fixed surface and the fixed assembly; the shortest distance between the first fixed surface and the fixed assembly is greater than a shortest distance between the fourth fixed surface and the fixed assembly; when viewed in the first direction, the fifth fixed surface overlaps at least a part of the seventh fixed surface; in the first direction, a shortest distance between the sixth fixed surface and the fixed assembly is shorter than a shortest distance between the seventh fixed surface and the fixed assembly.

According to some embodiments, the fixed assembly further includes a positioning assembly configured to position the fixed member; the positioning assembly has a protruding structure and extends in a direction perpendicular to the first direction and the third direction; the optical element driving mechanism further includes a magnetic-adjusting element configured to adjust magnetic force between the first magnetic element and the second magnetic element to avoid mutual magnetic interference between the first magnetic element and the second magnetic element to affect movement of the first movable assembly and the second movable assembly; the magnetic-adjusting element is fixedly disposed on the positioning assembly; the magnetic-adjusting element has a U-shaped structure.

According to some embodiments, the optical element driving mechanism further includes a first guiding assembly configured to guide the first movable assembly to move in the first direction relative to the fixed assembly; the first guiding assembly includes a guiding rod having a long strip-shaped structure extending in the first direction; the guiding rod passes through the first movable assembly; when viewed in a fourth direction perpendicular to the first direction and the third direction, the guiding rod overlaps at least a part of the first movable assembly; the first guiding assembly is configured to guide the second movable assembly to move in the first direction relative to the fixed assembly; the guiding rod passes through the second movable assembly; when viewed in the fourth direction, the guiding rod overlaps at least a part of the second movable assembly; a shortest distance between the first driving assembly and the guiding rod is the same as a shortest distance between the second driving assembly and the guiding rod; a shortest distance between the first coil and the guiding rod is the same as a shortest distance between the second coil and the guiding rod; a shortest distance between the first magnetic element and the guiding rod is the same as a shortest distance between the second magnetic element and the guiding rod; a shortest distance between the first magnetic-enhancing element and the guiding rod is the same as a shortest distance between the second magnetic-enhancing element and the guiding rod; a shortest distance between the first permeability element and the guiding rod is different from a shortest distance between the second permeability element and the guiding rod; the shortest distance between the first permeability element and the guiding rod is shorter than a shortest distance between the second permeability element and the guiding rod.

According to some embodiments, the optical element driving mechanism further includes a sensing assembly electrically connected to the first driving assembly, and the sensing assembly includes: a first reference element, having a long strip-shaped structure; a first sensing element, corresponding to the first reference element and configured to sense movement of the first movable assembly relative to the fixed assembly; a second reference element, having a long strip-shaped structure; a third reference element, having a long strip-shaped structure; a fourth reference element, having a long strip-shaped structure; and a second sensing element, corresponding to the third reference element and configured to sense movement of the second movable assembly relative to the fixed assembly; the extension directions of the first reference element and the second reference element are not parallel; a length of the first reference element is the same as a length of the second reference element; when viewed in the first direction, the first reference element overlaps at least a part of the second reference element; when viewed in the first direction, the first reference element does not overlap the first sensing element; when viewed in the fourth direction, the first reference element overlaps at least a part of the guiding rod; when viewed in the fourth direction, the first sensing element overlaps at least a part of the guiding rod; when viewed in the fourth direction, the first driving assembly does not overlap the guiding rod; the extension directions of the third reference element and the fourth reference element are not parallel; a length of the third reference element is the same as a length of the fourth reference element; the length of the first reference element is different from the length of the third reference element; the length of the first reference element is less than the length of the third reference element; when viewed in the first direction, the third reference element overlaps at least a part of the fourth reference element; when viewed in the first direction, the third reference element does not overlap the second sensing element; when viewed in the fourth direction, the third reference element overlaps at least a part of the guiding rod; when viewed in the fourth direction, the second sensing element overlaps at least a part of the guiding rod; when viewed in the fourth direction, the second driving assembly does not overlap the guiding rod; the optical element driving mechanism further includes a control element configured to control the first driving assembly to drive the first movable assembly to move relative to the fixed assembly; the control element is configured to control the second driving assembly to drive the second movable assembly to move relative to the fixed assembly; the control element is electrically connected to the first sensing element; the control element is electrically connected to the second sensing element; when viewed in the fourth direction, the control element is located between the first driving assembly and the second driving assembly; when viewed in the fourth direction, the control element is located between the first coil and the second coil; when viewed in the fourth direction, the control element is located between the first permeability element and the second permeability element; when viewed in the fourth direction, the first permeability element overlaps at least a part of the control element; when viewed in the fourth direction, the second permeability element overlaps at least a part of the control element; when viewed in the fourth direction, the control element overlaps at least a part of the positioning assembly; the optical element driving mechanism further includes a circuit assembly electrically connected to the first sensing element; the circuit assembly has a plate-shaped structure; the first sensing element is electrically connected to the control element via the circuit assembly; the control element is electrically connected to the first driving assembly via the circuit assembly.

According to some embodiments, the fixed assembly includes: a bottom plate, having a plate-shaped structure; and a base; the base is fixedly disposed on the bottom plate; the bottom plate includes a metal; the base includes a plastic material; at least a part of the first driving assembly is fixedly disposed on the base; the fixed member is fixedly disposed on the base; A permeability of the bottom plate is less than a permeability of the first permeability element; the base and the positioning assembly are integrally formed in one piece; a notch is formed on the base and is configured to accommodate the control element; when viewed in the fourth direction, the base does not overlap the first sensing element; when viewed in the fourth direction, the base overlaps at least a part of the control element; the circuit assembly is disposed between the base and the bottom plate.

According to some embodiments, the fixed assembly further includes: an outer frame, having a top surface and a side surface, having a plate-shaped structure, and the top surface is not parallel to the side surface; and a frame, fixedly disposed on the bottom plate; the outer frame has a metal material; the frame has a plastic material; the optical element driving mechanism further includes a third optical element, fixedly connected to the base; the third optical element has a lens to diffuse or converge a light beam; the base has a convex structure, corresponding to the third optical element; the third optical element is fixedly connected to the frame; the frame has a convex structure, corresponding to the third optical element; the light beam is incident on a photosensitive assembly through the first optical element, the second optical element, and the third optical element, and the photosensitive assembly includes a photosensitive element.

According to some embodiments, the optical element driving mechanism is configured to correspond to and be adjacent to an optical system; when viewed in the fourth direction, the optical element driving mechanism has a polygonal structure; when viewed in the fourth direction, the light beam enters from a first side of the optical element driving mechanism and exits from a second side, and the first side and the second side are parallel to each other; when viewed in the fourth direction, the first driving assembly is located at a third side of the optical element driving mechanism; when viewed in the fourth direction, the second driving assembly is located at the third side; when viewed in the fourth direction, the first sensing element is located at the third side; when viewed in the fourth direction, the second sensing element is located at the third side; when viewed in the fourth direction, a distance between an optical axis of the first optical element and a boundary of the third side is greater than a distance between the optical axis and a boundary of the fourth side of the optical element driving mechanism; the third side is parallel to the optical axis; the third side and the fourth side are parallel to each other; when viewed in the fourth direction, there is no electromagnetic driving assembly disposed on the fourth side; when viewed in the fourth direction, the optical system is located at the fourth side.

The present disclosure provides an optical element driving mechanism, including the first driving assembly and the second driving assembly configured to respectively drive the first movable assembly and the second movable assembly to move along the first dimension. The first movable assembly and the second movable assembly respectively hold the first optical element and the second optical element, and the first movable assembly and the second movable assembly can be individually or cooperatively driven so as to achieve the function of optical zoom.

In addition, the optical element driving mechanism may include a first guiding assembly, which may include a guiding rod passing through the first movable assembly and the second movable assembly, so that the first movable assembly and the second movable assembly can move steadily in the first direction. In addition, the first driving assembly includes the first permeability element and the first magnetic element, the first permeability element is affixed to the fixed member, and the first magnetic element is affixed to the first movable assembly. Based on the magnetic attraction force between the first permeability element and the first magnetic element, the stability of the first movable assembly when moving along the guiding rod can be further improved.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
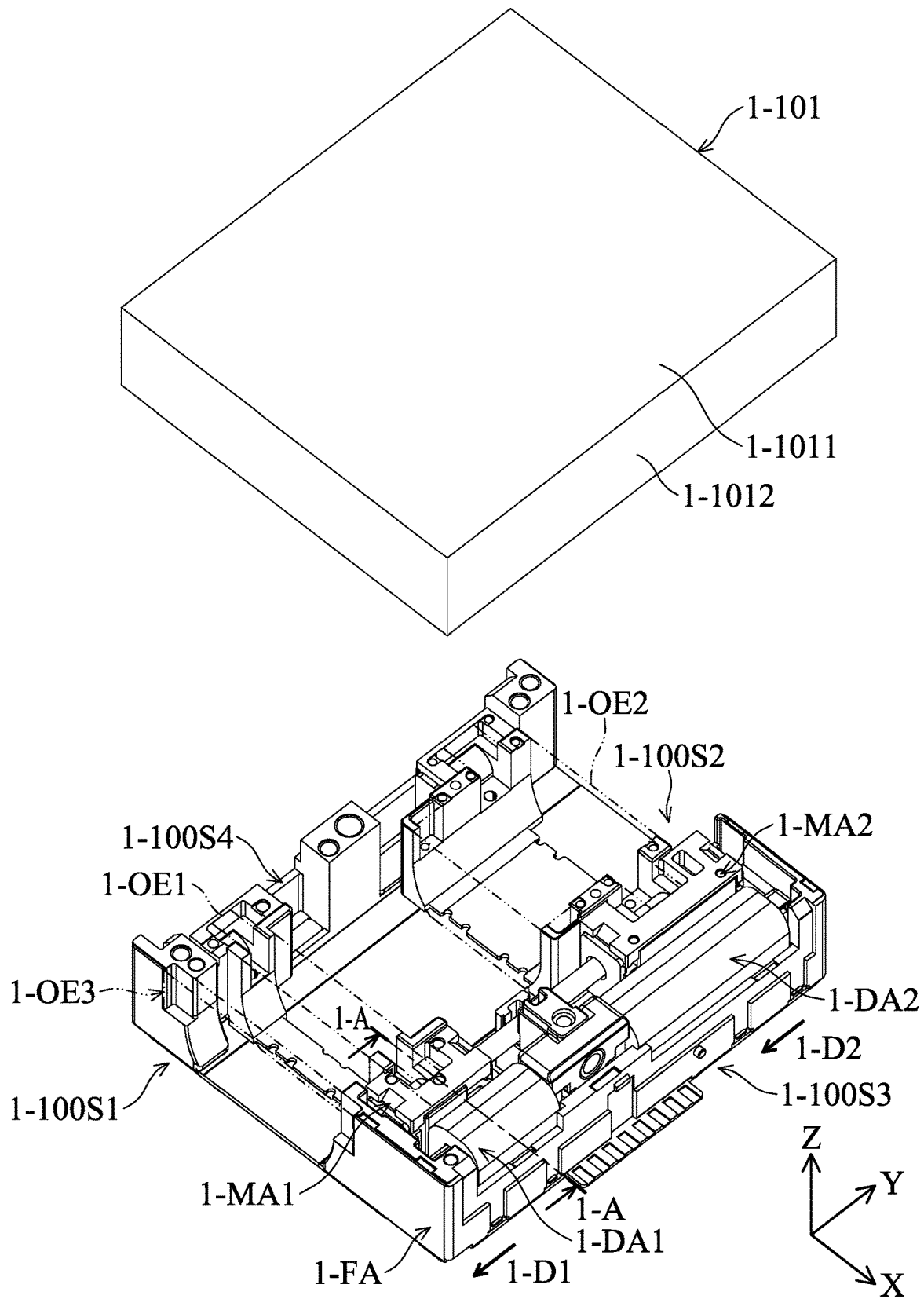
FIG. 1 is a schematic diagram of an optical element driving mechanism 1-100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
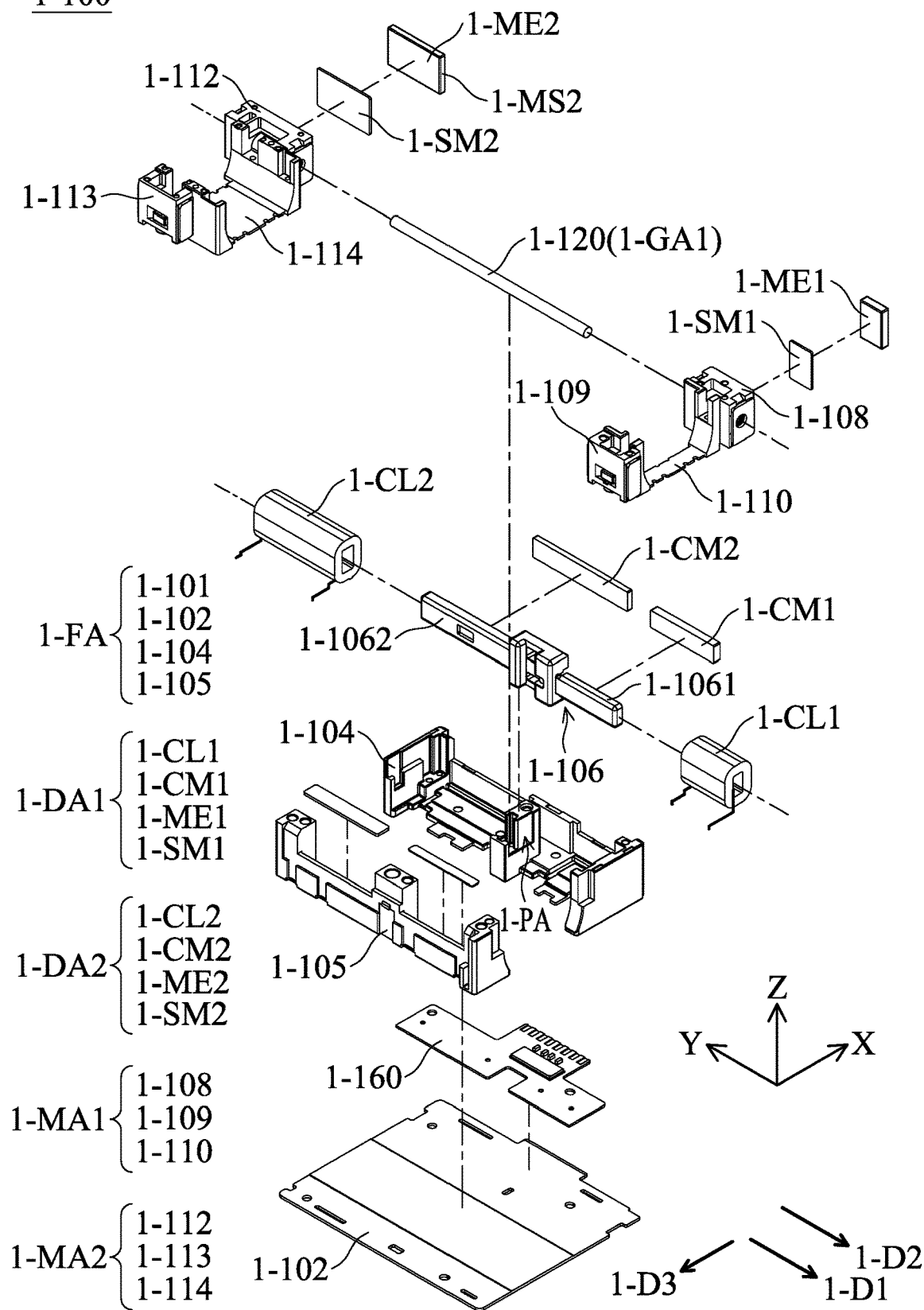
FIG. 2 is an exploded diagram of the optical element driving mechanism 1-100 according to an embodiment of the present disclosure.
Figure 3:
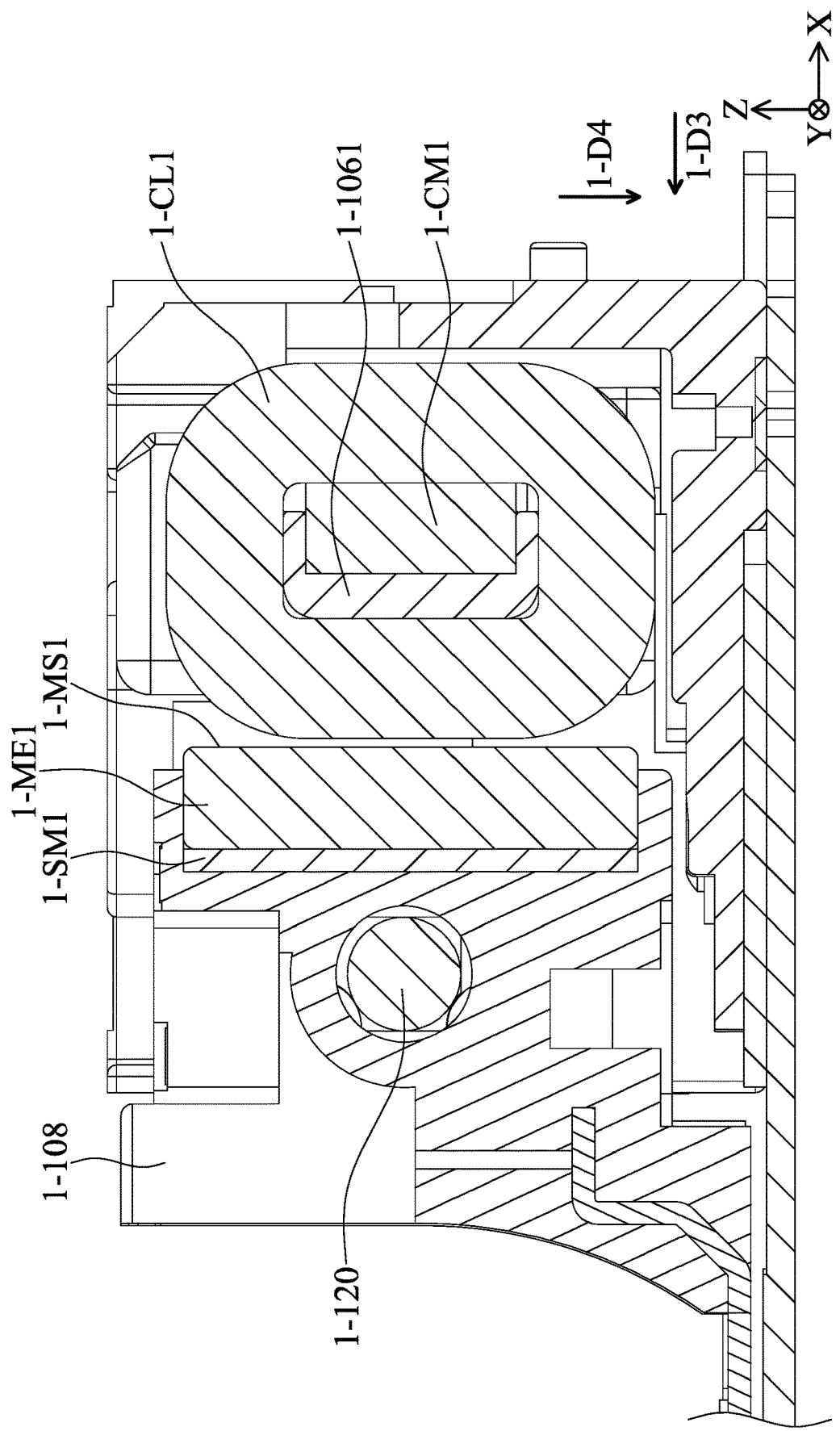
FIG. 3 is a cross-sectional view of the optical element driving mechanism 1-100 along line 1-A-1-A in FIG. 1 according to an embodiment of the present disclosure.

Please refer to FIG. 1 to FIG. 3. FIG. 1 is a schematic diagram of an optical element driving mechanism 1-100 according to an embodiment of the present disclosure, FIG. 2 is an exploded diagram of the optical element driving mechanism 1-100 according to an embodiment of the present disclosure, and FIG. 3 is a cross-sectional view of the optical element driving mechanism 1-100 along line 1-A-1-A in FIG. 1 according to an embodiment of the present disclosure. The optical element driving mechanism 1-100 can be an optical camera module and can be configured to hold and drive an optical element. The optical element driving mechanism 1-100 can be installed in various electronic devices or portable electronic devices, such as a smartphone, for allowing a user to perform the image capturing function. In this embodiment, the optical element driving mechanism 1-100 can be a voice coil motor (VCM) with an auto-focusing (AF) function, but it is not limited thereto. In other embodiments, the optical element driving mechanism 1-100 can also perform the functions of auto-focusing and optical image stabilization (OIS).

In this embodiment, the optical element driving mechanism 1-100 may include a fixed assembly 1-FA, a first movable assembly 1-MA1, a first driving assembly 1-DA1, a second movable assembly 1-MA2, and a second driving assembly 1-DA2.

The fixed assembly 1-FA includes an outer frame 1-101, a bottom plate 1-102, a base 1-104, and a frame 1-105. The outer frame 1-101 has a U-shaped structure and may include a top surface 1-1011 and a side surface 1-1012, both of which have a plate-shaped structure, and the top surface 1-1011 is not parallel to the side surface 1-1012. Specifically, the top surface 1-1011 is perpendicular to the side surface 1-1012. The outer frame 1-101 has a metal material, but it is not limited to this.

The bottom plate 1-102 has a plate-shaped structure, and the bottom plate 1-102 has a metal material. The base 1-104 is fixedly disposed on the bottom plate 1-102, and the base 1-104 includes a plastic material. The frame 1-105 is fixedly disposed on the bottom plate 1-102, and the frame 1-105 can also include a plastic material.

The first movable assembly 1-MA1 is configured to connect to a first optical element 1-OE1, and the first movable assembly 1-MA1 is movable relative to the fixed assembly 1-FA. The first driving assembly 1-DA1 is configured to drive the first movable assembly 1-MA1 to move relative to the fixed assembly 1-FA. Specifically, the first driving assembly 1-DA1 is configured to drive the first movable assembly 1-MA1 to move relative to the fixed assembly 1-FA in a first dimension. The movement in the first dimension is a linear movement in a first direction 1-D1.

The second movable assembly 1-MA2 is movable relative to the first movable assembly 1-MA1. The second movable assembly 1-MA2 is configured to connect to a second optical element 1-OE2, and the second movable assembly 1-MA2 is movable relative to the fixed assembly 1-FA. The second driving assembly 1-DA2 is configured to drive the second movable assembly 1-MA2 to move relative to the fixed assembly 1-FA. Specifically, the second driving assembly 1-DA2 is configured to drive the second movable assembly 1-MA2 to move in a second dimension relative to the first movable assembly 1-MA1 and the fixed assembly 1-FA. The movement in the second dimension is a linear movement in a second direction 1-D2. The second direction 1-D2 may be parallel to the first direction 1-D1, but it is not limited thereto.

In this embodiment, the first optical element 1-OE1 is a lens, and the second optical element 1-OE2 may also be a lens, but it is not limited thereto.

The first movable assembly 1-MA1 includes a first loading part 1-108 and a first sliding part 1-109, and the first loading part 1-108 is fixedly connected to the first sliding part 1-109 through a first middle part 1-110 of the first movable assembly 1-MA1. The first optical element 1-OE1 is located between the first loading part 1-108 and the first sliding part 1-109.

The first loading part 1-108 has a plastic material, the first sliding part 1-109 has a plastic material, and the first middle part 1-110 has a metal material. The first loading part 1-108 and the first sliding part 1-109 are arranged along a third direction 1-D3, and the third direction 1-D3 is perpendicular to the first direction 1-D1. The first middle part 1-110 has an long strip-shaped structure extending along the third direction 1-D3.

Similarly, the second movable assembly 1-MA2 includes a second loading part 1-112, a second sliding part 1-113, and a second middle part 1-114. The second loading part 1-112 is fixedly connected to the second sliding part 1-113 through the second middle part 1-114. The second optical element 1-OE2 is located between the second loading part 1-112 and the second sliding part 1-113. The second loading part 1-112 and the second sliding part 1-113 include a plastic material, and the second middle part 1-114 includes a metal material.

The first driving assembly 1-DA1 includes a first coil 1-CL1, a first permeability element 1-CM1, a first magnetic element 1-ME1, a first magnetic-enhancing element 1-SM1, and a first fixed element 1-1061. The first permeability element 1-CM1 corresponds to the first coil 1-CL1, and the first magnetic element 1-ME1 corresponds to the first coil 1-CL1 and is configured to generate a first driving force to drive the first movable assembly 1-MA1. The first magnetic element 1-ME1 has a first surface 1-MS1 facing the first coil 1-CL1, as shown in FIG. 3.

The first magnetic-enhancing element 1-SM1 corresponds to the first magnetic element 1-ME1 and is configured to adjust the magnetic field of the first magnetic element 1-ME1. The first magnetic-enhancing element 1-SM1 and the first magnetic element 1-ME1 are fixedly disposed in the first loading part 1-108, and the first magnetic-enhancing element 1-SM1 is fixedly connected to the first magnetic element 1-ME1 to adjust the magnetic field of the first magnetic element 1-ME1.

The first permeability element 1-CM1 has a metal material, and the first coil 1-CL1 is wound around the first permeability element 1-CM1. Specifically, the first fixed element 1-1061 is fixedly connected to the first permeability element 1-CM1, and the first coil 1-CL1 is wound around the first permeability element 1-CM1 and the first fixed element 1-1061. The first fixed element 1-1061 includes a plastic material.

As shown in FIG. 3, when viewed in the first direction 1-D1 which is parallel to the first surface 1-MS1, at least a part (the left part) of the first coil 1-CL1 is located between the first magnetic element 1-ME1 and the first permeability element 1-CM1.

When viewed in the first direction 1-D1, at least a part of the first fixed element 1-1061 is located between the first permeability element 1-CM1 and the first coil 1-CL1. When viewed in the first direction 1-D1, at least a part of the first fixed element 1-1061 is located between the first permeability element 1-CM1 and the first magnetic element 1-ME1.

Figure 4:
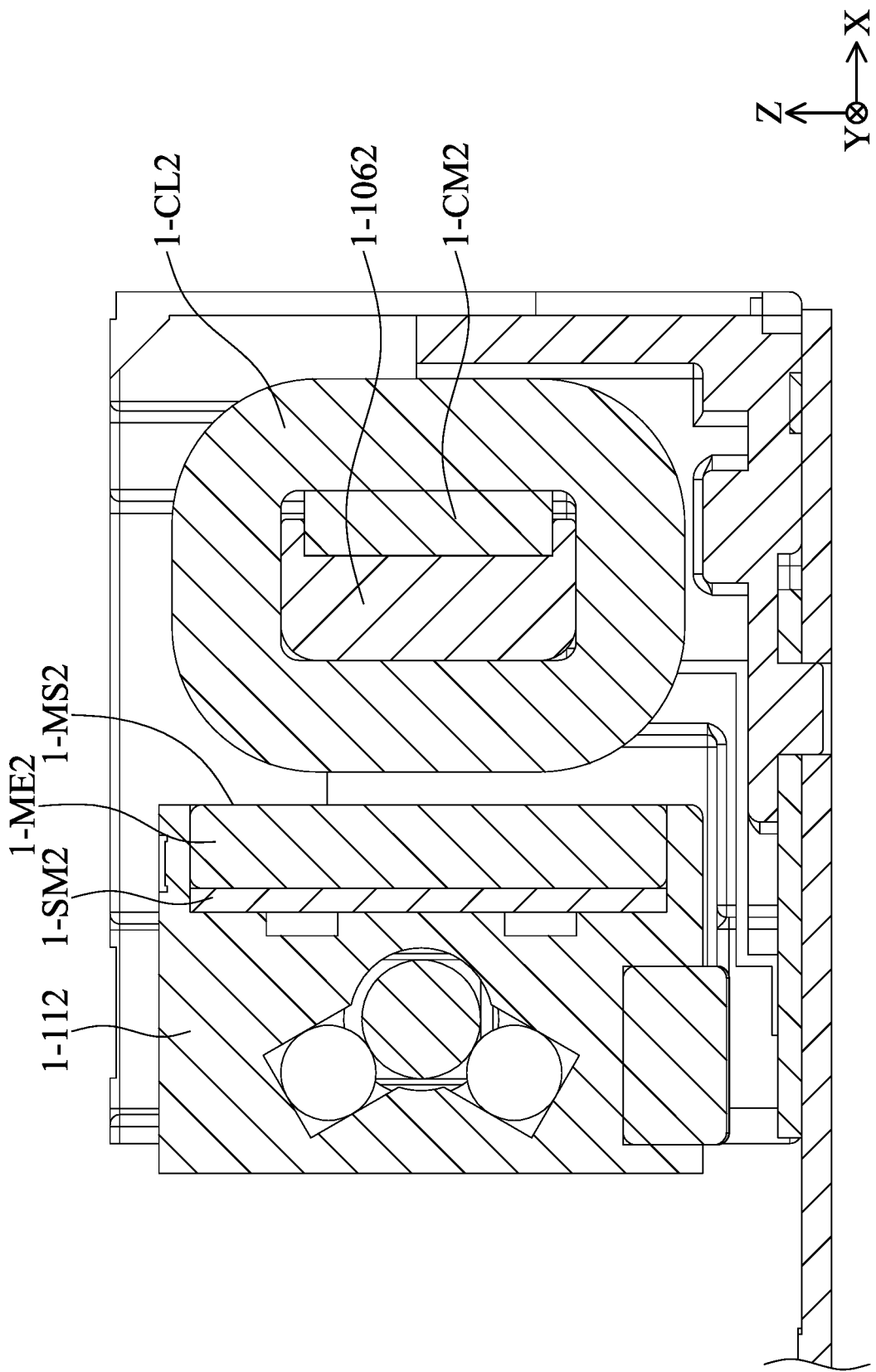
FIG. 4 is a cross-sectional view of the optical element driving mechanism 1-100 along the XZ plane according to an embodiment of the present disclosure.

Please refer to FIG. 2 and FIG. 4, and FIG. 4 is a cross-sectional view of the optical element driving mechanism 1-100 along the XZ plane according to an embodiment of the present disclosure. Similarly, the second driving assembly 1-DA2 includes a second coil 1-CL2, a second permeability element 1-CM2, a second magnetic element 1-ME2, a second magnetic-enhancing element 1-SM2, and a second fixed element 1-1062. The second permeability element 1-CM2 corresponds to the second coil 1-CL2, and the second magnetic element 1-ME2 corresponds to the second coil 1-CL2 and is configured to generate a second driving force to drive the second movable assembly 1-MA2. The second magnetic element 1-ME2 has a second surface 1-MS2, which faces the second coil 1-CL2.

The second magnetic-enhancing element 1-SM2 corresponds to the second magnetic element 1-ME2 and is configured to adjust the magnetic field of the second magnetic element 1-ME2. The second magnetic-enhancing element 1-SM2 and the second magnetic element 1-ME2 are fixedly disposed in the second loading part 1-112, and the second magnetic-enhancing element 1-SM2 is fixedly connected to the second magnetic element 1-ME2 to adjust the magnetic field of the second magnetic element 1-ME2.

The second permeability element 1-CM2 has a metal material, and the second coil 1-CL2 is wound around the second permeability element 1-CM2. Specifically, the second fixed element 1-1062 is fixedly connected to the second permeability element 1-CM2, and the second coil 1-CL2 is wound around the second permeability element 1-CM2 and the second fixed element 1-1062. The second fixed element 1-1062 includes a plastic material.

As shown in FIG. 4, when viewed in the second direction 1-D2 which is parallel to the second surface 1-MS2, at least a part (the left part) of the second coil 1-CL2 is located between the second magnetic element 1-ME2 and the second permeability element 1-CM2.

When viewed in the second direction 1-D2, at least a part of the second fixed element 1-1062 is located between the second permeability element 1-CM2 and the second coil 1-CL2. When viewed in the second direction 1-D2, at least a part of the second fixed element 1-1062 is located between the second permeability element 1-CM2 and the second magnetic element 1-ME2.

Figure 5:
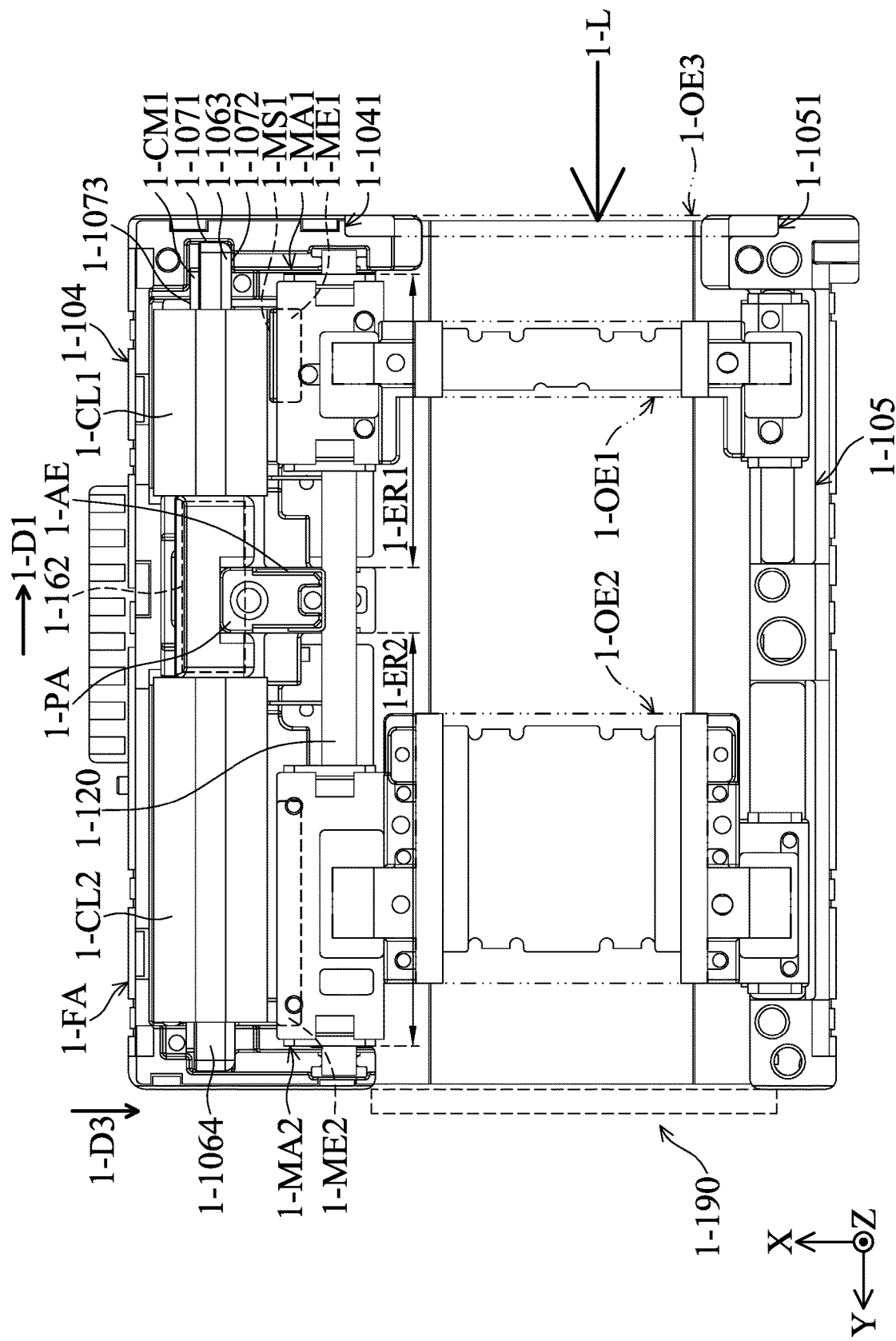
FIG. 5 is a top view of the optical element driving mechanism 100 according to an embodiment of the present disclosure.
Figure 6:
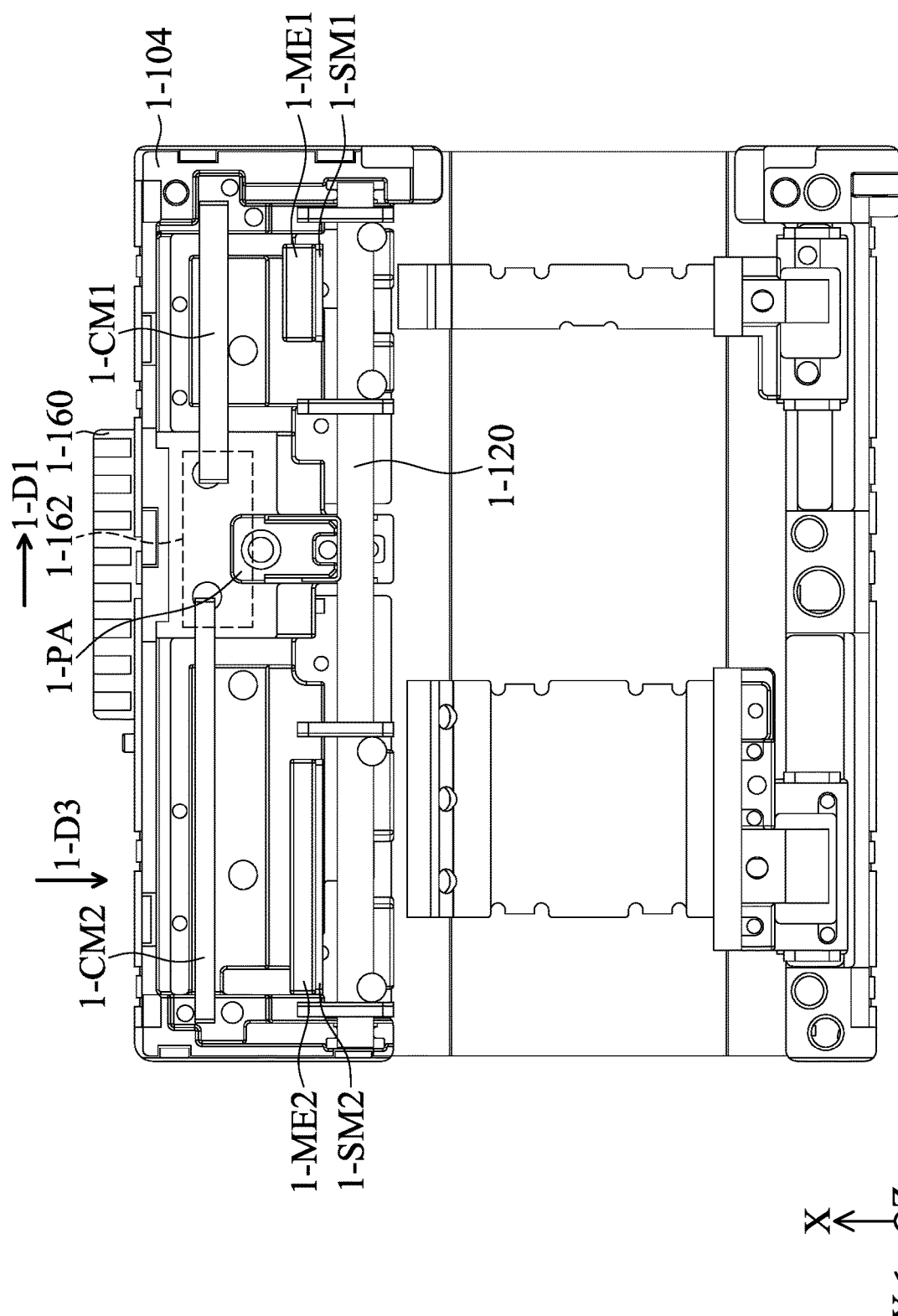
FIG. 6 is a top view of a partial structure of the optical element driving mechanism 100 according to an embodiment of the present disclosure.

Please refer to FIG. 5 and FIG. 6. FIG. 5 is a top view of the optical element driving mechanism 100 according to an embodiment of the present disclosure, and FIG. 6 is a top view of a partial structure of the optical element driving mechanism 100 according to an embodiment of the present disclosure. In this embodiment, the first movable assembly 1-MA1 is movable relative to the fixed assembly 1-FA in the first dimension within a first extreme range 1-ER1, and the second movable assembly 1-MA2 is movable relative to the fixed assembly 1-FA in the first dimension within a second extreme range 1-ER2.

The first extreme range 1-ER1 is different from the second extreme range 1-ER2. Specifically, the first extreme range 1-ER1 is smaller than the second extreme range 1-ER2.

As shown in FIG. 6, in the third direction 1-D3 which is perpendicular to the first surface 1-MS1, the minimum size of the first permeability element 1-CM1 is different from the minimum size of the second permeability element 1-CM2. In the third direction 1-D3, the minimum size of the first permeability element 1-CM1 is greater than the minimum size of the second permeability element 1-CM2.

In this embodiment, the thickness of the first permeability element 1-CM1 having a plate-shaped structure is different from the thickness of the second permeability element 1-CM2 having the plate-shaped structure. Specifically, the thickness of the first permeability element 1-CM1 is greater than the thickness of the second permeability element 1-CM2.

Furthermore, the shortest distance between the first magnetic element 1-ME1 and the first coil 1-CL1 is different from the shortest distance between the second magnetic element 1-ME2 and the second coil 1-CL2. Specifically, the shortest distance between the first magnetic element 1-ME1 and the first coil 1-CL1 is shorter than the shortest distance between the second magnetic element 1-ME2 and the second coil 1-CL2.

As shown in FIG. 6, in the third direction 1-D3, the maximum size of the first magnetic element 1-ME1 is different from the maximum size of the second magnetic element 1-ME2. Specifically, in the third direction 1-D3, the maximum size of the first magnetic element 1-ME1 is greater than the maximum size of the second magnetic element 1-ME2.

In the first direction 1-D1, the maximum size of the first magnetic element 1-ME1 is different from the maximum size of the second magnetic element 1-ME2. Specifically, in the first direction 1-D1, the maximum size of the first magnetic element 1-ME1 is less than the maximum size of the second magnetic element 1-ME2.

When viewed in the first direction 1-D1, a surface of the first permeability element 1-CM1 perpendicular to the third direction 1-D3 (such as the upper surface in FIG. 6) overlaps at least a part of the second permeability element 1-CM2.

Based on the above structural configuration, the electromagnetic driving force and the attractive force between the magnetic element and the corresponding permeability element can be effectively adjusted, so that the first movable assembly 1-MA1 and the second movable assembly 1-MA2 within different moving ranges can maintain a good balance.

In this embodiment, the first fixed element 1-1061 and the second fixed element 1-1062 can form a fixed member 1-106. The second fixed element 1-1062 and the first fixed element 1-1061 have an integral structure. That is, they are not connected to each other by connecting means such as glue or welding.

In the first direction 1-D1, a first end portion 1-1063 of the fixed member 1-106 having an long strip-shaped structure is not in contact with the fixed assembly 1-FA. In the first direction 1-D1, a second end portion 1-1064 of the fixed member 1-106 is not in contact with the fixed assembly 1-FA, and the first end portion 1-1063 and the second end portion 1-1064 are arranged along the first direction 1-D1.

Figure 7:
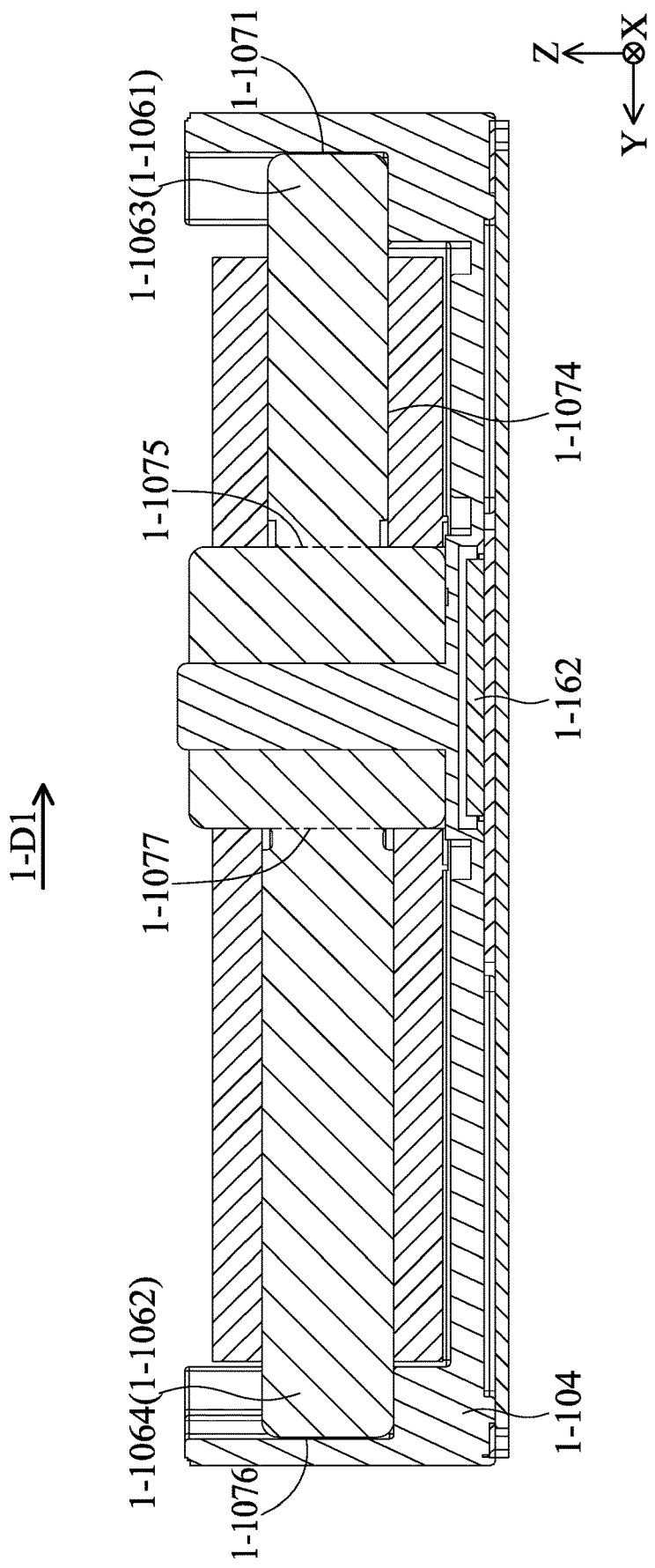
FIG. 7 is a cross-sectional view of the optical element driving mechanism 1-100 along the YZ plane according to an embodiment of the present disclosure.

Please refer to FIG. 5 and FIG. 7. FIG. 7 is a cross-sectional view of the optical element driving mechanism 1-100 along the YZ plane according to an embodiment of the present disclosure. As shown in FIG. 5 and FIG. 7, the fixed member 1-106 further includes a first fixed surface 1-1071, a second fixed surface 1-1072, a third fixed surface 1-1073, a fourth fixed surface 1-1074, a fifth fixed surface 1-1075, a sixth fixed surface 1-1076, and a seventh fixed surface 1-1077.

The first fixed surface 1-1071 is located at the first end portion 1-1063 and is perpendicular to the first direction 1-D1. The second fixed surface 1-1072 is located at the first end portion 1-1063 and is parallel to the first surface 1-MS1. The third fixed surface 1-1073 is located at the first end portion 1-1063, and the second fixed surface 1-1072 and the third fixed surface 1-1073 face in opposite directions. The fourth fixed surface 1-1074 is located at the first end portion 1-1063 and is perpendicular to the first fixed surface 1-1071 and the second fixed surface 1-1072. The fifth fixed surface 1-1075 and the first fixed surface 1-1071 face in opposite directions.

The first fixed surface 1-1071 is located at the first fixed element 1-1061, the second fixed surface 1-1072 is located at the first fixed element 1-1061, the third fixed surface 1-1073 is located at the first permeability element 1-CM1, the fourth fixed surface 1-1074 is located at the first fixed element 1-1061, and the fifth fixed surface 1-1075 is located at the first fixed element 1-1061.

The sixth fixed surface 1-1076 is located at the second end portion 1-1064 and is perpendicular to the first direction 1-D1. The seventh fixed surface 1-1077 and the sixth fixed surface 1-1076 face the opposite directions. The sixth fixed surface 1-1076 is located at the second fixed element 1-1062, and the seventh fixed surface 1-1077 is located at the second fixed element 1-1062.

As shown in FIG. 5, in the first direction 1-D1, the shortest distance between the first fixed surface 1-1071 and the fixed assembly 1-FA is shorter than the shortest distance between the fifth fixed surface 1-1075 and the fixed assembly 1-FA. Specifically, the shortest distance between the first fixed surface 1-1071 and the base 1-104 in the first direction 1-D1 is not zero. That is, the first fixed surface 1-1071 does not contact the base 1-104.

In a direction perpendicular to the second fixed surface 1-1072, such as in the third direction 1-D3, the shortest distance between the second fixed surface 1-1072 and the fixed assembly 1-FA is greater than the shortest distance between third fixed surface 1-1073 and the fixed assembly 1-FA. For example, the third fixed surface 1-1073 contacts the base 1-104, but the second fixed surface 1-1072 does not contact the base 1-104.

Furthermore, the shortest distance between the first fixed surface 1-1071 and the fixed assembly 1-FA is greater than the shortest distance between the fourth fixed surface 1-1074 and the fixed assembly 1-FA. Specifically, the fourth fixed surface 1-1074 contacts the base 1-104, but the first fixed surface 1-1071 does not contact the base 1-104.

When viewed in the first direction 1-D1, the fifth fixed surface 1-1075 overlaps at least a part of the seventh fixed surface 1-1077. In the first direction 1-D1, the shortest distance between the sixth fixed surface 1-1076 and the fixed assembly 1-FA is shorter than the shortest distance between the seventh fixed surface 1-1077 and the fixed assembly 1-FA.

Based on the above structural design, the fixed member 1-106 can be accurately positioned on the base 1-104, and the overall structural strength can be increased.

Figure 8:
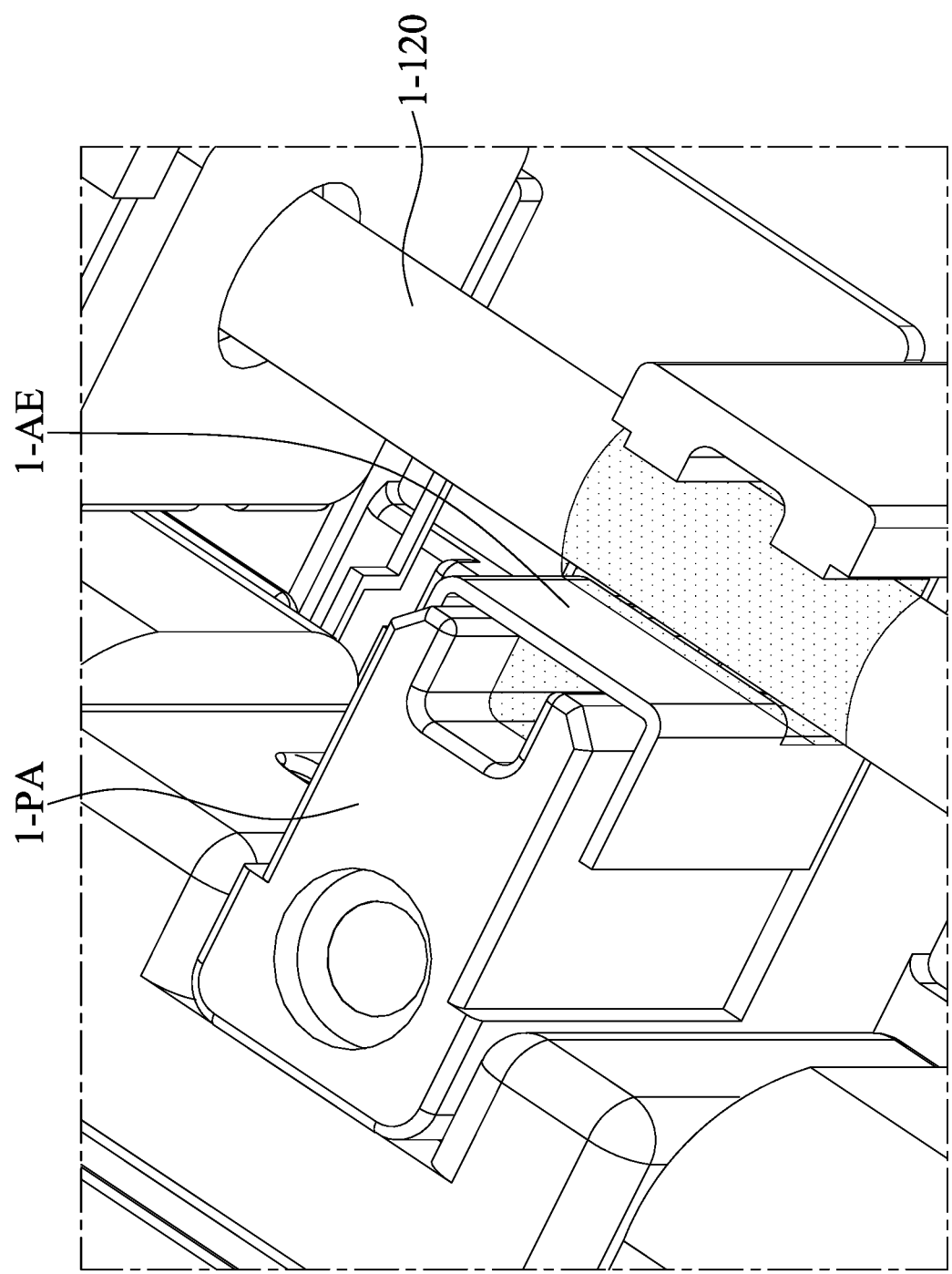
FIG. 8 is an enlarged view of the optical element driving mechanism 1-100 according to an embodiment of the present disclosure.

Please refer to FIG. 2, FIG. 5, and FIG. 8. FIG. 8 is an enlarged view of the optical element driving mechanism 1-100 according to an embodiment of the present disclosure. In this embodiment, the base 1-104 of the fixed assembly 1-FA further includes a positioning assembly 1-PA, which is configured to position the fixed member 1-106. The positioning assembly 1-PA has a protruding structure and extends along a direction (the Z-axis) perpendicular to the first direction 1-D1 and the third direction 1-D3.

Furthermore, the optical element driving mechanism 1-100 includes a magnetic-adjusting element 1-AE, located between the first loading part 1-108 and the second loading part 1-112, and is configured to adjust the magnetic force between the first magnetic element 1-ME1 and the second magnetic element 1-ME2 so as to avoid mutual magnetic interference between the first magnetic element 1-ME2 and the second magnetic element 1-ME2 to affect the movement of the first movable assembly 1-MA1 and the second movable assembly 1-MA2.

The magnetic-adjusting element 1-AE is fixedly disposed on the positioning assembly 1-PA, and the magnetic-adjusting element 1-AE may have a U-shaped structure. The magnetic-adjusting element 1-AE may have a metal material, for example, but it is not limited thereto.

Please continue to refer to FIG. 2 to FIG. 8. The optical element driving mechanism 1-100 further includes a first guiding assembly 1-GA1 configured to guide the first movable assembly 1-MA1 to move in the first direction 1-D1 relative to the fixed assembly 1-FA. The first guiding assembly 1-GA1 includes a guiding rod 1-120 having an long strip-shaped structure extending in the first direction 1-D1. The guiding rod 1-120 passes through the first loading part 1-108 of the first movable assembly 1-MA1. When viewed in a fourth direction 1-D4 (the Z-axis) which is perpendicular to the first direction 1-D1 and the third direction 1-D3, the guiding rod 1-120 overlaps at least a part of the first movable assembly 1-MA1.

Similarly, the guiding rod 1-120 of the first guiding assembly 1-GA1 is configured to guide the second movable assembly 1-MA2 to move in the first direction 1-D1 relative to the fixed assembly 1-FA. The guiding rod 1-120 passes through the second loading part 1-112 of the second movable assembly 1-MA2. When viewed in the fourth direction 1-D4, the guiding rod 1-120 overlaps at least a part of the second movable assembly 1-MA2.

In this embodiment, the shortest distance between the first driving assembly 1-DA1 and the guiding rod 1-120 is the same as the shortest distance between the second driving assembly 1-DA2 and the guiding rod 1-120. For example, as shown in FIG. 5, the shortest distance between the first coil 1-CL1 and the guiding rod 1-120 is the same as the shortest distance between the second coil 1-CL2 and the guiding rod 1-120 (in the third direction 1-D3).

In addition, as shown in FIG. 6, the shortest distance between the first magnetic element 1-ME1 and the guiding rod 1-120 is the same as the shortest distance between the second magnetic element 1-ME2 and the guiding rod 1-120 (in the third direction 1-D3). Similarly, the shortest distance between the first magnetic-enhancing element 1-SM1 and the guiding rod 1-120 is the same as the shortest distance between the second magnetic-enhancing element 1-SM2 and the guiding rod 1-120 (in the third direction 1-D3).

As shown in FIG. 6, the shortest distance between the first permeability element 1-CM1 and the guiding rod 1-120 is different from the shortest distance between the second permeability element 1-CM2 and the guiding rod 1-120. Specifically, the shortest distance between the first permeability element 1-CM1 and the guiding rod 1-120 is shorter than the shortest distance between the second permeability element 1-CM2 and the guiding rod 1-120 (in the third direction 1-D3).

Based on the above structural configuration, the purpose of miniaturization can be achieved, and the overall balance can also be achieved.

Figure 9:
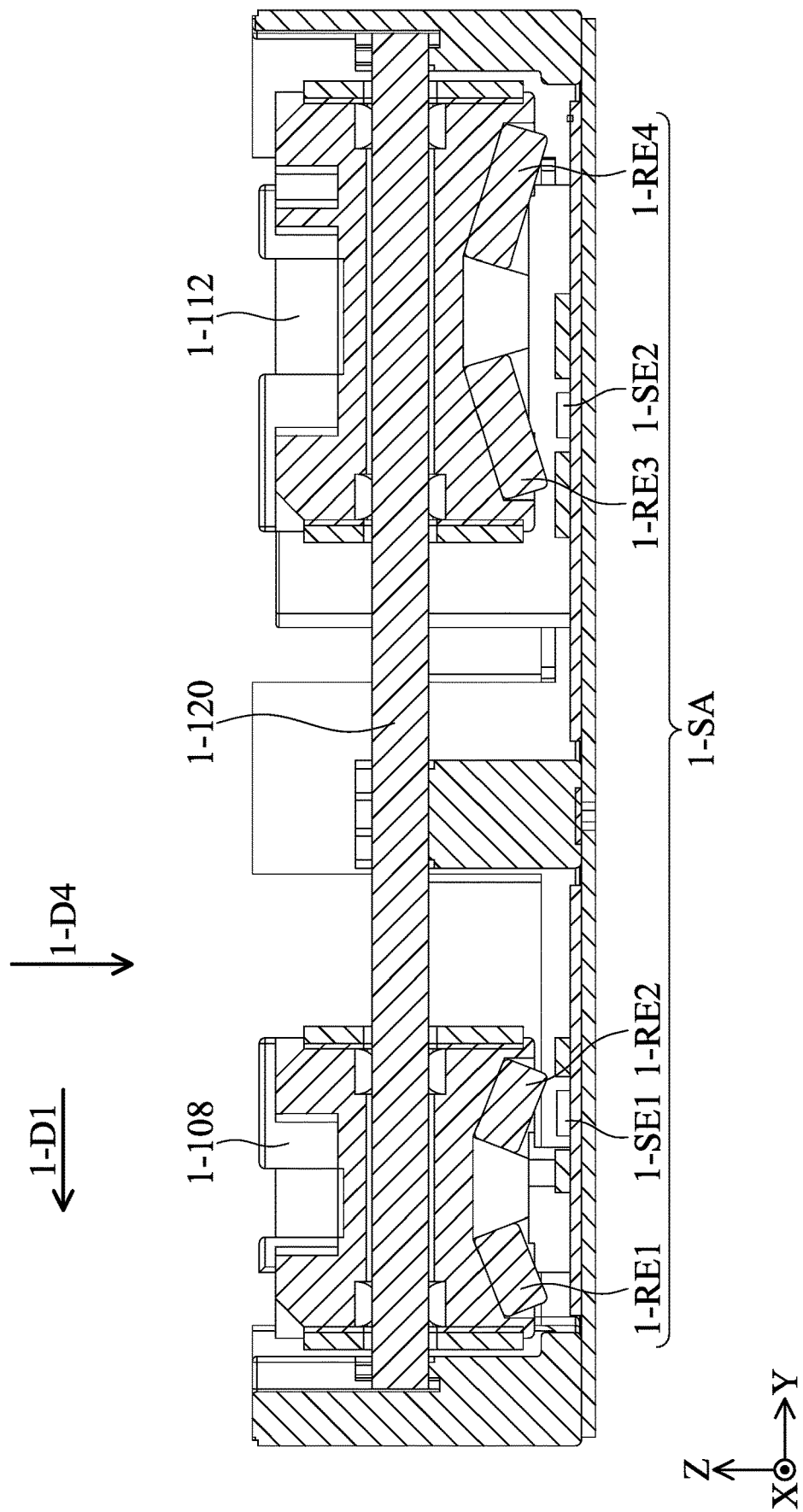
FIG. 9 is a cross-sectional view of the optical element driving mechanism 1-100 along the YZ plane according to an embodiment of the present disclosure.

Please refer to FIG. 9, which is a cross-sectional view of the optical element driving mechanism 1-100 along the YZ plane according to an embodiment of the present disclosure. The optical element driving mechanism 1-100 may further include a sensing assembly 1-SA, which is electrically connected to the first driving assembly 1-DA1 and the second driving assembly 1-DA2. The sensing assembly 1-SA may include a first reference element 1-RE1, a second reference element 1-RE2, a third reference element 1-RE3, a fourth reference element 1-RE4, a first sensing element 1-SE1, and a second sensing element 1-SE2.

The first reference element 1-RE1, the second reference element 1-RE2, the third reference element 1-RE3, and the fourth reference element 1-RE4 may be Hall magnets, and the first sensing element 1-SE1 and the second sensing element 1-SE2 may be Hall sensors, but it is not limited to this embodiment.

The first reference element 1-RE1 has an long strip-shaped structure, the second reference element 1-RE2 has an long strip-shaped structure, the third reference element 1-RE3 has an long strip-shaped structure, and the fourth reference element 1-RE4 has a long strip-shaped structure. The first sensing element 1-SE1 corresponds to the first reference element 1-RE1 and the second reference element 1-RE2 and is configured to sense the movement of the first movable assembly 1-MA1 relative to the fixed assembly 1-FA.

The second sensing element 1-SE2 corresponds to the third reference element 1-RE3 and the fourth reference element 1-RE4 and is configured to sense the movement of the second movable assembly 1-MA2 relative to the fixed assembly 1-FA.

As shown in FIG. 9, the extension directions of the first reference element 1-RE1 and the second reference element 1-RE2 are not parallel, and the length of the first reference element 1-RE1 is the same as the length of the second reference element 1-RE2. When viewed in the first direction 1-D1, the first reference element 1-RE1 overlaps at least a part of the second reference element 1-RE2, and when viewed in the first direction 1-D1, the first reference element 1-RE1 does not overlap the first sensing element 1-SE1.

In addition, when viewed in the fourth direction 1-D4, the first reference element 1-RE1 overlaps at least a part of the guiding rod 1-120. When viewed in the fourth direction 1-D4, the first sensing element 1-SE1 overlaps at least a part of the guiding rod 1-120. Furthermore, when viewed in the fourth direction 1-D4, the first driving assembly 1-DA1 does not overlap the guiding rod 1-120 (FIG. 5).

Similarly, the extension directions of the third reference element 1-RE3 and the fourth reference element 1-RE4 are not parallel, and the length of the third reference element 1-RE3 is the same as the length of the fourth reference element 1-RE4. It should be noted that the length of the first reference element 1-RE1 is different from the length of the third reference element 1-RE3. Specifically, the length of the first reference element 1-RE1 is smaller than the length of the third reference element 1-RE3.

When viewed in the first direction 1-D1, the third reference element 1-RE3 overlaps at least a part of the fourth reference element 1-RE4. When viewed in the first direction 1-D1, the third reference element 1-RE3 does not overlap the second sensing element 1-SE2.

In addition, when viewed in the fourth direction 1-D4, the third reference element 1-RE3 overlaps at least a part of the guiding rod 1-120. When viewed in the fourth direction 1-D4, the second sensing element 1-SE2 overlaps at least a part of the guiding rod 1-120. Furthermore, when viewed in the fourth direction 1-D4, the second driving assembly 1-DA2 does not overlap the guiding rod 1-120 (FIG. 5).

As shown in FIG. 2, FIG. 6, FIG. 7, and FIG. 9, the optical element driving mechanism 1-100 further includes a circuit assembly 1-160 and a control element 1-162. The circuit assembly 1-160 is, for example, a flexible circuit board, and the control element 1-162 is, for example, a control integrated circuit (IC), which is disposed on the circuit assembly 1-160. The circuit assembly 1-160 can be electrically connected to the first sensing element 1-SE1 and the second sensing element 1-SE2. For example, the first sensing element 1-SE1 and the second sensing element 1-SE2 are disposed on the circuit assembly 1-160.

The circuit assembly 1-160 has a plate-shaped structure, the first sensing element 1-SE1 is electrically connected to the control element 1-162 via the circuit assembly 1-160, and the control element 1-162 is electrically connected to the first driving assembly 1-DA1 via the circuit assembly 1-160.

The control element 1-162 is configured to control the first driving assembly 1-DA1 to drive the first movable assembly 1-MA1 to move relative to the fixed assembly 1-FA, and the control element 1-162 is configured to control the second driving assembly 1-DA2 to drive the second movable assembly 1-MA2 to move relative to the fixed assembly 1-FA. The control element 1-162 is electrically connected to the first sensing element 1-SE1, and the control element 1-162 is electrically connected to the second sensing element 1-SE2.

As shown in FIG. 5, when viewed in the fourth direction 1-D4, the control element 1-162 is located between the first driving assembly 1-DA1 and the second driving assembly 1-DA2. Specifically, when viewed in the fourth direction 1-D4, the control element 1-162 is located between the first coil 1-CL1 and the second coil 1-CL2.

As shown in FIG. 6, when viewed in the fourth direction 1-D4, the control element 1-162 is located between the first permeability element 1-CM1 and the second permeability element 1-CM2. When viewed in the fourth direction 1-D4, the first permeability element 1-CM1 overlaps at least a part of the control element 1-162. When viewed in the fourth direction 1-D4, the second permeability element 1-CM2 overlaps at least a part of the control element 1-162. When viewed in the fourth direction 1-D4, the control element 1-162 overlaps at least a part of the positioning assembly 1-PA.

Please refer to FIG. 2, FIG. 7, FIG. 9 to FIG. 10, and FIG. 10 is a cross-sectional view of the optical element driving mechanism 1-100 along the XZ plane according to an embodiment of the present disclosure. At least a part of the first driving assembly 1-DA1 is fixedly disposed on the base 1-104. For example, the fixed member 1-106 is fixedly disposed on the base 1-104.

It is worth noting that the permeability of the bottom plate 1-102 is less than the permeability of the first permeability element 1-CM1 or the second permeability element 1-CM2 so as to avoid the problem of magnetic field interference. In addition, the base 1-104 and the positioning assembly 1-PA are integrally formed in one piece so as to increase the overall structural strength.

Figure 10:
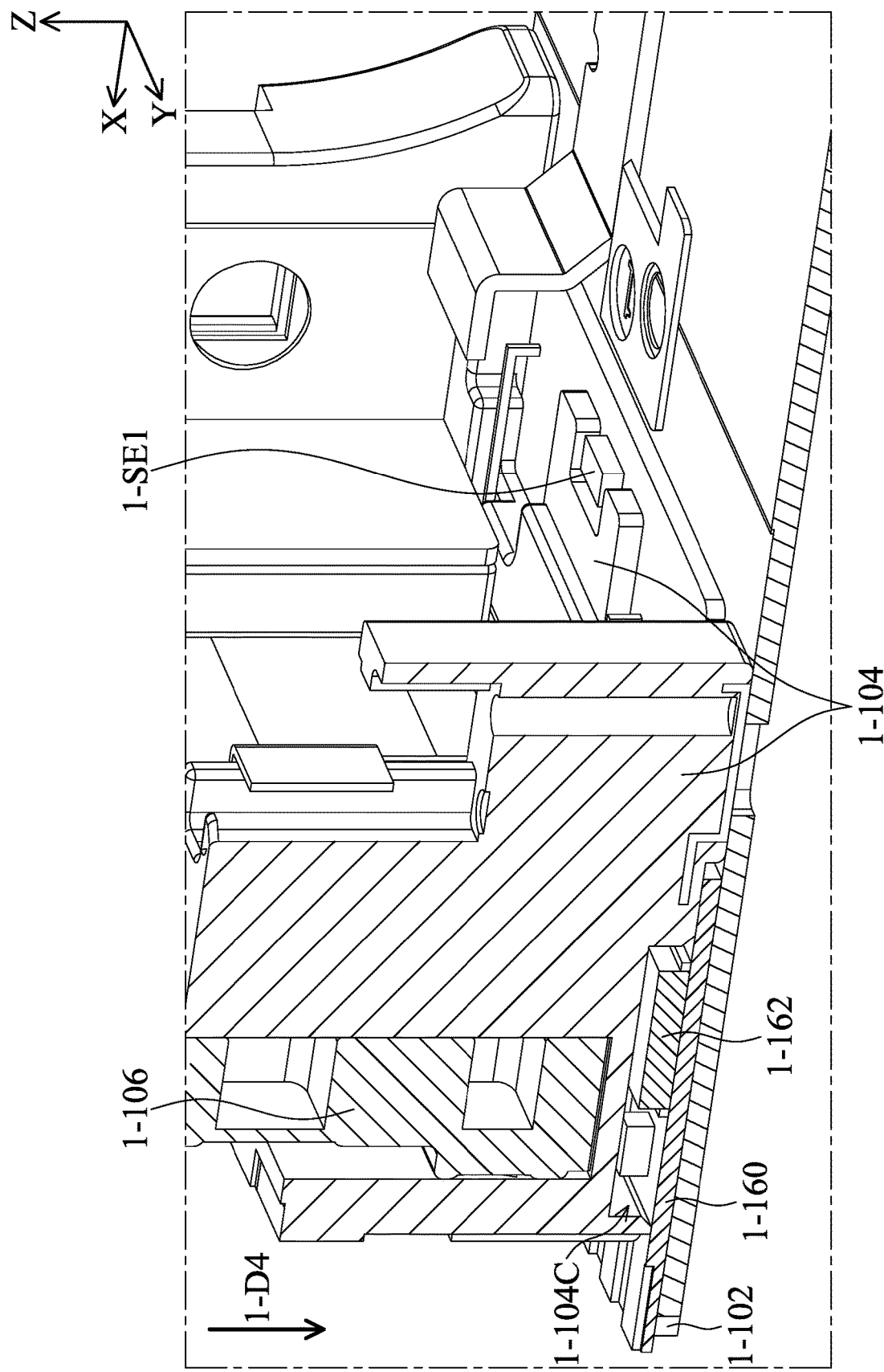
FIG. 10 is a cross-sectional view of the optical element driving mechanism 1-100 along the XZ plane according to an embodiment of the present disclosure.

As shown in FIG. 10, a notch 1-104C is formed on the base 1-104 and is configured to accommodate the control element 1-162. When viewed in the fourth direction 1-D4, the base 1-104 does not overlap the first sensing element 1-SE1. Specifically, the first sensing element 1-SE1 is not occulted by the base 1-104. Furthermore, when viewed in the fourth direction 1-D4, the base 1-104 overlaps at least a part of the control element 1-162, and the circuit assembly 1-160 is disposed between the base 1-104 and the bottom plate 1-102.

Based on the above design, the magnetic field reversal problem can be avoided, the circuit assembly 1-160 can be prevented from being damaged, the accuracy of the sensing assembly 1-SA can be improved, the overall mechanical strength can be improved, and the effect of miniaturization can be achieved.

Please return to FIG. 5. In this embodiment, the optical element driving mechanism 1-100 may further include a third optical element 1-OE3, which is fixedly connected to the base 1-104. The third optical element 1-OE3 can be a lens configured to diffuse or converge a light beam 1-L. The base 1-104 has a concave structure 1-1041, corresponding to the third optical element 1-OE3.

Similarly, the third optical element 1-OE3 is fixedly connected to frame 1-105. Specifically, the frame 1-105 has a concave structure 1-1051, corresponding to the third optical element 1-OE3.

The light beam 1-L passes through the third optical element 1-OE3, the first optical element 1-OE1, and the second optical element 1-OE2 in sequence to be incident on a photosensitive assembly 1-190. The photosensitive assembly 1-190 may include a photosensitive element (not shown in the figures) configured to receive the light beam 1-L to generate a digital image signal. In this embodiment, the photosensitive assembly 1-190 can be affixed to the base 1-104, for example.

Figure 11:
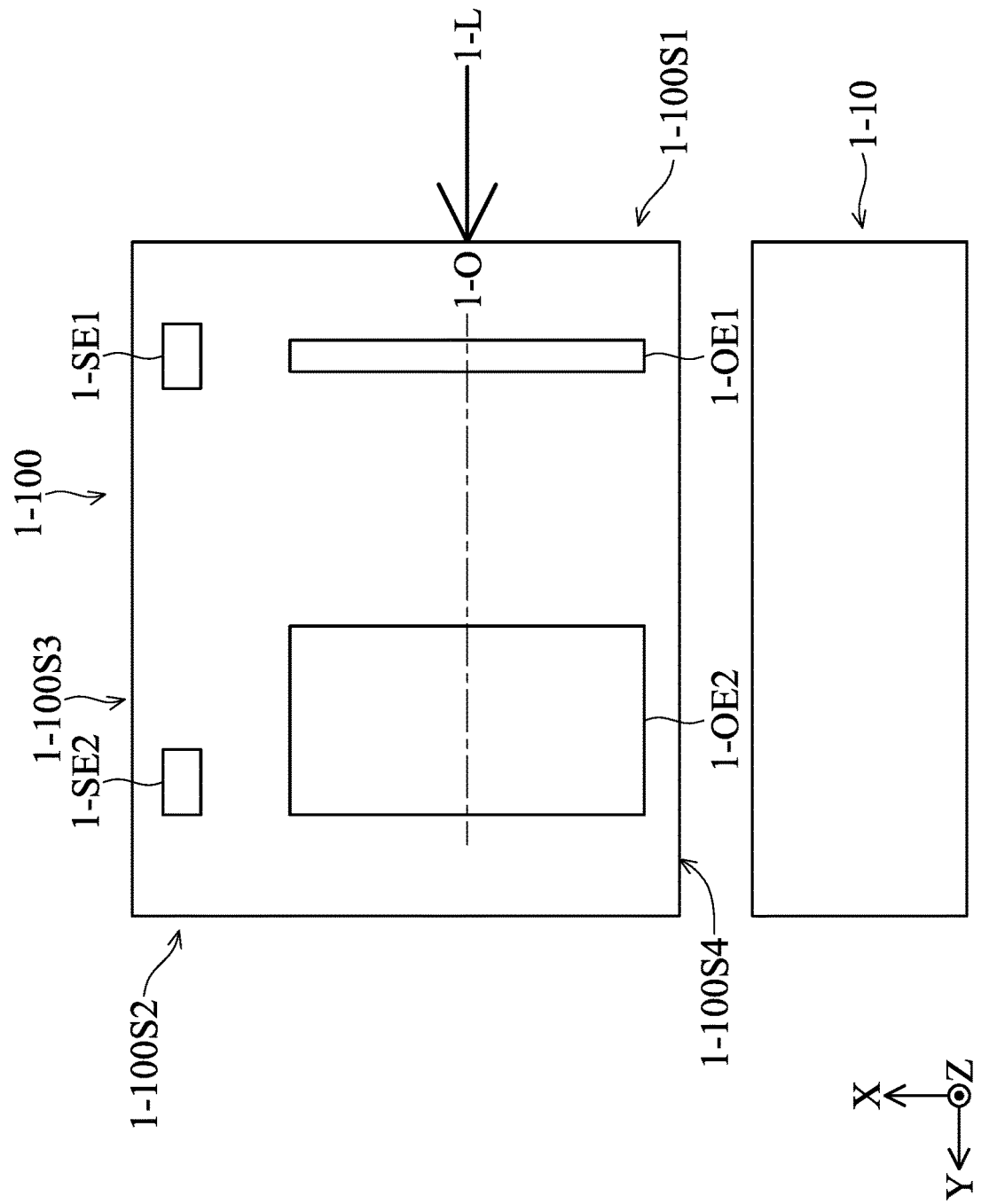
FIG. 11 is a partial structural diagram of the optical element driving mechanism 1-100 and an optical system 1-10 according to an embodiment of the present disclosure.

Please refer to FIG. 1 and FIG. 11. FIG. 11 is a partial structural diagram of the optical element driving mechanism 1-100 and an optical system 1-10 according to an embodiment of the present disclosure. As shown in FIG. 11, the optical element driving mechanism 1-100 is configured to correspond to and is adjacent to the optical system 1-10, and the optical system 1-10 is, for example, a camera module.

When viewed in the fourth direction 1-D4 (the Z-axis), the optical element driving mechanism 1-100 has a polygonal structure, such as a rectangular structure. When viewed in the fourth direction 1-D4, the light beam 1-L enters from a first side 1-100S1 of the optical element driving mechanism 1-100 and exits from a second side 1-100S2, and the first side 1-100S1 and the second side 1-100S2 are parallel to each other.

When viewed in the fourth direction 1-D4, the first driving assembly 1-DA1 is located at a third side 1-100S3 of the optical element driving mechanism 1-100, and when viewed in the fourth direction 1-D4, the second driving assembly 1-DA2 is located at the third side 1-100S3.

When viewed in the fourth direction 1-D4, the first sensing element 1-SE1 is located at the third side 1-100S3, and when viewed in the fourth direction 1-D4, the second sensing element 1-SE2 is located at the third side 1-100S3.

When viewed in the fourth direction 1-D4, the distance between an optical axis 1-O of the first optical element 1-OE1 and the boundary of the third side 1-100S3 is greater than the distance between the optical axis 1-O and the boundary of a fourth side1-100S4 of the optical element driving mechanism 1-100. The third side 1-100S3 is parallel to the optical axis 1-O, and the third side 1-100S3 and the fourth side 1-100S4 are parallel to each other.

It should be noted that when viewed in the fourth direction 1-D4, there is no electromagnetic driving assembly disposed on the fourth side 1-100S4, and when viewed in the fourth direction 1-D4, the optical system 1-10 is located at the fourth side 1-100S4.

In this embodiment, the optical element driving mechanism 1-100 and the optical system 1-10 can be installed in an electronic device (not shown in the figures), such as a smartphone. Therefore, based on the above design, the optical system 1-10 is arranged at the fourth side 1-100S4 without any driving components or sensing elements, which can effectively utilize the space in the electronic device and achieve the purpose of overall miniaturization.

In summary, the present disclosure provides an optical element driving mechanism 1-100, including the first driving assembly 1-DA1 and the second driving assembly 1-DA2 configured to respectively drive the first movable assembly 1-MA1 and the second movable assembly 1-MA2 to move along the first dimension. The first movable assembly 1-MA1 and the second movable assembly 1-MA2 respectively hold the first optical element 1-OE1 and the second optical element 1-OE2, and the first movable assembly 1-MA1 and the second movable assembly 1-MA2 can be individually or cooperatively driven so as to achieve the function of optical zoom.

In addition, the optical element driving mechanism 1-100 may include a first guiding assembly 1-GA1, which may include a guiding rod 1-120 passing through the first movable assembly 1-MA1 and the second movable assembly 1-MA2, so that the first movable assembly 1-MA1 and the second movable assembly 1-MA2 can move steadily in the first direction 1-D1. In addition, the first driving assembly 1-DA1 includes the first permeability element 1-CM1 and the first magnetic element 1-ME1, the first permeability element 1-CM1 is affixed to the fixed member 1-106, and the first magnetic element 1-ME1 is affixed to the first movable assembly 1-MA1. Based on the magnetic attraction force between the first permeability element 1-CM1 and the first magnetic element 1-ME1, the stability of the first movable assembly 1-MA1 when moving along the guiding rod 1-120 can be further improved.

Figure 12:
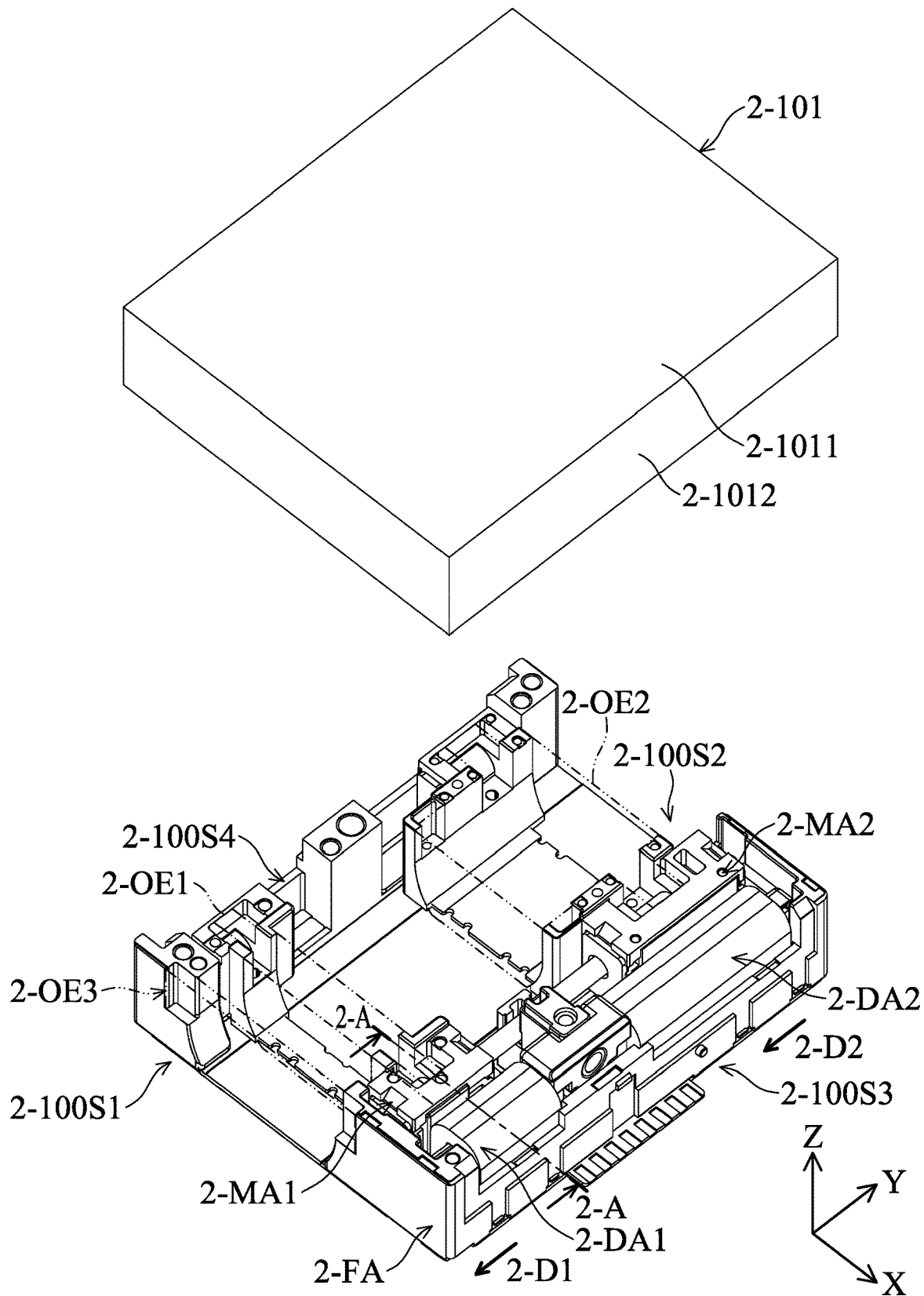
FIG. 12 is a schematic diagram of an optical element driving mechanism 2-100 according to an embodiment of the present disclosure.
Figure 13:
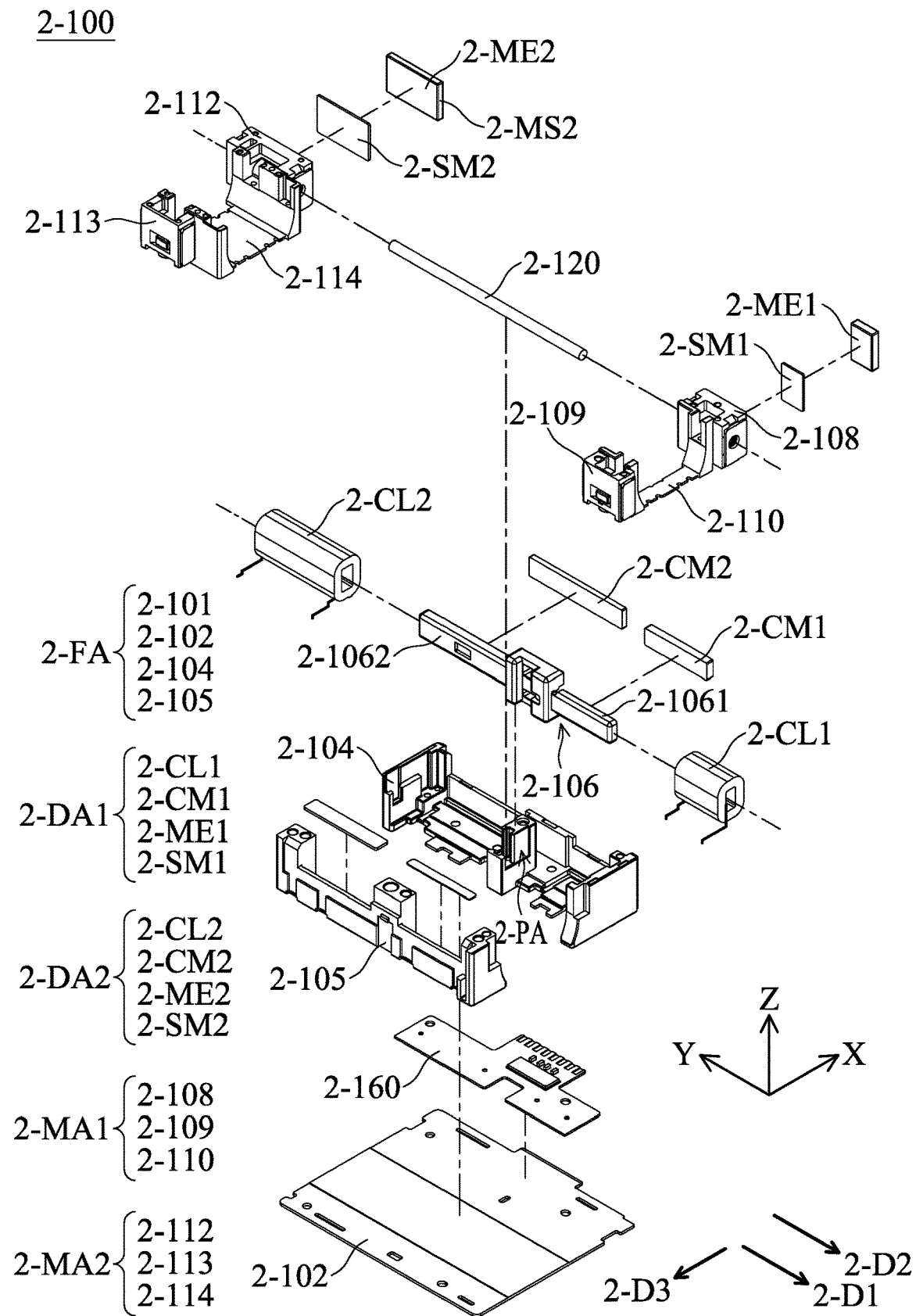
FIG. 13 is an exploded diagram of the optical element driving mechanism 2-100 according to an embodiment of the present disclosure.
Figure 14:
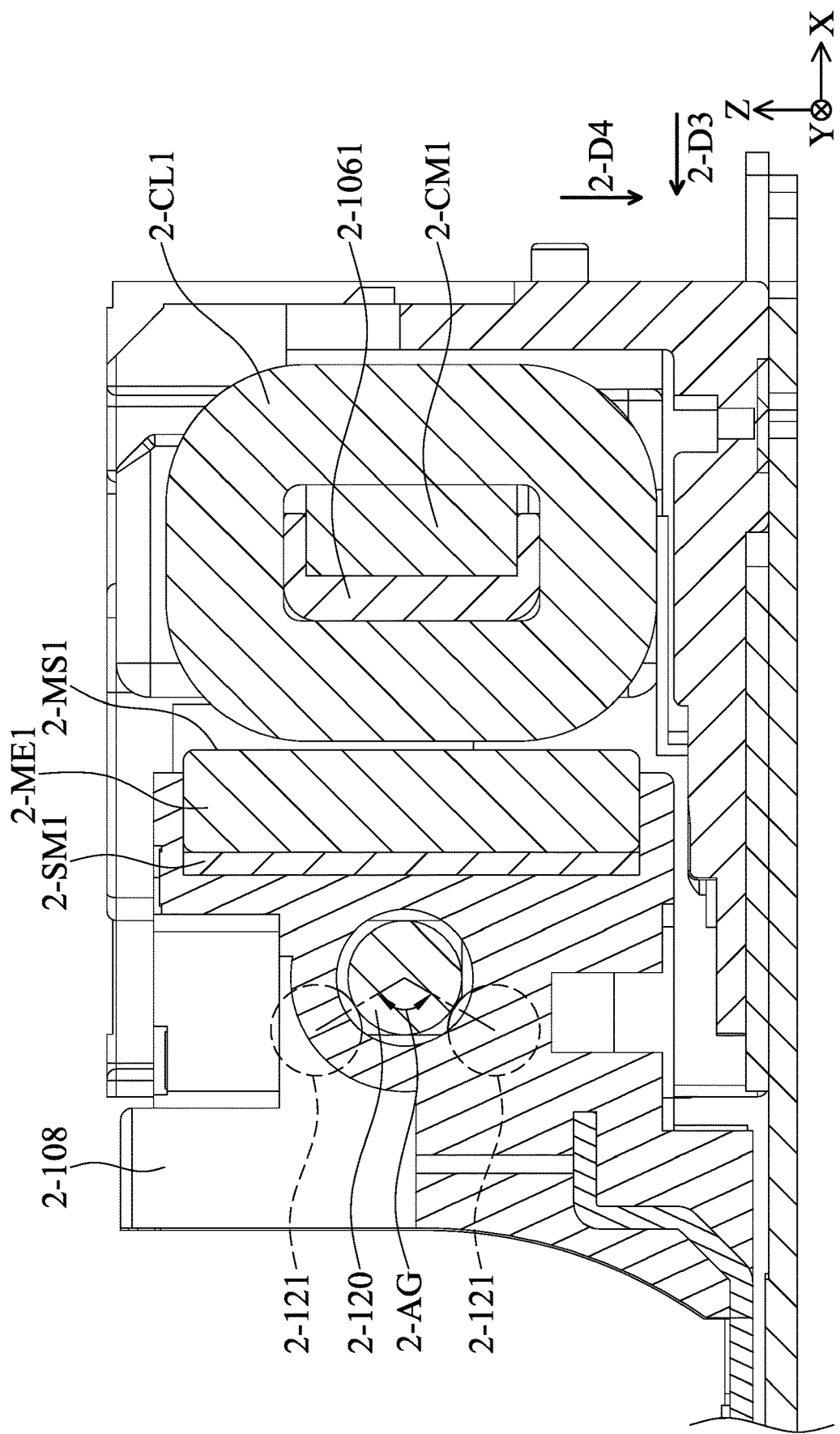
FIG. 14 is a cross-sectional view of the optical element driving mechanism 2-100 along line 2-A-2-A in FIG. 12 according to an embodiment of the present disclosure.

Please refer to FIG. 12 to FIG. 14. FIG. 12 is a schematic diagram of an optical element driving mechanism 2-100 according to an embodiment of the present disclosure, FIG. 13 is an exploded diagram of the optical element driving mechanism 2-100 according to an embodiment of the present disclosure, and FIG. 14 is a cross-sectional view of the optical element driving mechanism 2-100 along line 2-A-2-A in FIG. 12 according to an embodiment of the present disclosure. The optical element driving mechanism 2-100 can be an optical camera module and can be configured to hold and drive an optical element. The optical element driving mechanism 2-100 can be installed in various electronic devices or portable electronic devices, such as a smartphone, for allowing a user to perform the image capturing function. In this embodiment, the optical element driving mechanism 2-100 can be a voice coil motor (VCM) with an auto-focusing (AF) function, but it is not limited thereto. In other embodiments, the optical element driving mechanism 2-100 can also perform the functions of auto-focusing and optical image stabilization (OIS).

In this embodiment, the optical element driving mechanism 2-100 may include a fixed assembly 2-FA, a first movable assembly 2-MA1, a first driving assembly 2-DA1, a second movable assembly 2-MA2, and a second driving assembly 2-DA2.

The fixed assembly 2-FA includes an outer frame 2-101, a bottom plate 2-102, a base 2-104, and a frame 2-105. The outer frame 2-101 has a U-shaped structure and may include a top surface 2-1011 and a side surface 2-1012, both of which have a plate-shaped structure, and the top surface 2-1011 is not parallel to the side surface 2-1012. Specifically, the top surface 2-1011 is perpendicular to the side surface 2-1012. The outer frame 2-101 has a metal material, but it is not limited to this.

The bottom plate 2-102 has a plate-shaped structure, and the bottom plate 2-102 has a metal material. The base 2-104 is fixedly disposed on the bottom plate 2-102, and the base 2-104 includes a plastic material. The frame 2-105 is fixedly disposed on the bottom plate 2-102, and the frame 2-105 can also include a plastic material.

The first movable assembly 2-MA1 is configured to connect to a first optical element 2-OE1, and the first movable assembly 2-MA1 is movable relative to the fixed assembly 2-FA. The first driving assembly 2-DA1 is configured to drive the first movable assembly 2-MA1 to move relative to the fixed assembly 2-FA. Specifically, the first driving assembly 2-DA1 is configured to drive the first movable assembly 2-MA1 to move relative to the fixed assembly 2-FA in a first dimension. The movement in the first dimension is a linear movement in a first direction 2-D1.

The second movable assembly 2-MA2 is movable relative to the first movable assembly 2-MA1. The second movable assembly 2-MA2 is configured to connect to a second optical element 2-OE2, and the second movable assembly 2-MA2 is movable relative to the fixed assembly 2-FA. The second driving assembly 2-DA2 is configured to drive the second movable assembly 2-MA2 to move relative to the fixed assembly 2-FA. Specifically, the second driving assembly 2-DA2 is configured to drive the second movable assembly 2-MA2 to move in a second dimension relative to the first movable assembly 2-MA1 and the fixed assembly 2-FA. The movement in the second dimension is a linear movement in a second direction 2-D2. The second direction 2-D2 may be parallel to the first direction 2-D1, but it is not limited thereto. That is, the first dimension is different from the second dimension.

In this embodiment, the first optical element 2-OE1 is a lens, and the second optical element 2-OE2 may also be a lens, but it is not limited thereto.

The first movable assembly 2-MA1 includes a first loading part 2-108 and a first sliding part 2-109, and the first loading part 2-108 is fixedly connected to the first sliding part 2-109 through a first middle part 2-110 of the first movable assembly 2-MA1. The first optical element 2-OE1 is located between the first loading part 2-108 and the first sliding part 2-109.

The first loading part 2-108 has a plastic material, the first sliding part 2-109 has a plastic material, and the first middle part 2-110 has a metal material. The first loading part 2-108 and the first sliding part 2-109 are arranged along a third direction 2-D3, and the third direction 2-D3 is perpendicular to the first direction 2-D1. The first middle part 2-110 has an long strip-shaped structure extending along the third direction 2-D3.

Similarly, the second movable assembly 2-MA2 includes a second loading part 2-112, a second sliding part 2-113, and a second middle part 2-114. The second loading part 2-112 is fixedly connected to the second sliding part 2-113 through the second middle part 2-114. The second optical element 2-OE2 is located between the second loading part 2-112 and the second sliding part 2-113. The second loading part 2-112 and the second sliding part 2-113 include a plastic material, and the second middle part 2-114 includes a metal material.

The first driving assembly 2-DA1 includes a first coil 2-CL1, a first permeability element 2-CM1, a first magnetic element 2-ME1, a first magnetic-enhancing element 2-SM1, and a first fixed element 2-1061. The first permeability element 2-CM1 corresponds to the first coil 2-CL1, and the first magnetic element 2-ME1 corresponds to the first coil 2-CL1 and is configured to generate a first driving force to drive the first movable assembly 2-MA1. The first magnetic element 2-ME1 has a first surface 2-MS1 facing the first coil 2-CL1, as shown in FIG. 14.

The first magnetic-enhancing element 2-SM1 corresponds to the first magnetic element 2-ME1 and is configured to adjust the magnetic field of the first magnetic element 2-ME1. The first magnetic-enhancing element 2-SM1 and the first magnetic element 2-ME1 are fixedly disposed in the first loading part 2-108, and the first magnetic-enhancing element 2-SM1 is fixedly connected to the first magnetic element 2-ME1 to adjust the magnetic field of the first magnetic element 2-ME1.

The first permeability element 2-CM1 has a metal material, and the first coil 2-CL1 is wound around the first permeability element 2-CM1. Specifically, the first fixed element 2-1061 is fixedly connected to the first permeability element 2-CM1, and the first coil 2-CL1 is wound around the first permeability element 2-CM1 and the first fixed element 2-1061. The first fixed element 2-1061 includes a plastic material.

As shown in FIG. 14, when viewed in the first direction 2-D1 which is parallel to the first surface 2-MS1, at least a part (the left part) of the first coil 2-CL1 is located between the first magnetic element 2-ME1 and the first permeability element 2-CM1.

When viewed in the first direction 2-D1, at least a part of the first fixed element 2-1061 is located between the first permeability element 2-CM1 and the first coil 2-CL1. When viewed in the first direction 2-D1, at least a part of the first fixed element 2-1061 is located between the first permeability element 2-CM1 and the first magnetic element 2-ME1.

Figure 15:
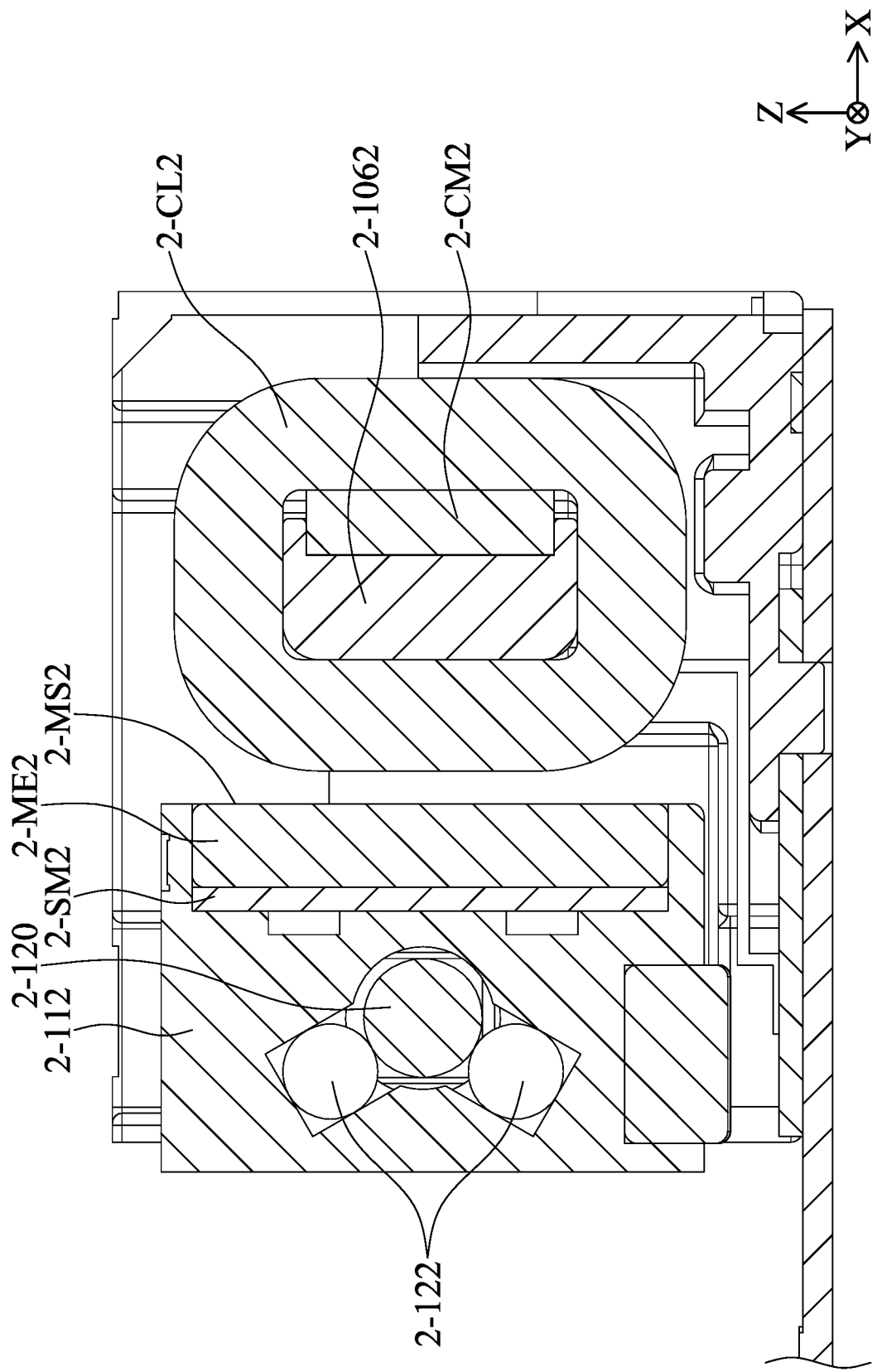
FIG. 15 is a cross-sectional view of the optical element driving mechanism 2-100 along the XZ plane according to an embodiment of the present disclosure.

Please refer to FIG. 13 and FIG. 15, and FIG. 15 is a cross-sectional view of the optical element driving mechanism 2-100 along the XZ plane according to an embodiment of the present disclosure. Similarly, the second driving assembly 2-DA2 includes a second coil 2-CL2, a second permeability element 2-CM2, a second magnetic element 2-ME2, a second magnetic-enhancing element 2-SM2, and a second fixed element 2-1062. The second permeability element 2-CM2 corresponds to the second coil 2-CL2, and the second magnetic element 2-ME2 corresponds to the second coil 2-CL2 and is configured to generate a second driving force to drive the second movable assembly 2-MA2. The second magnetic element 2-ME2 has a second surface 2-MS2, which faces the second coil 2-CL2.

The second magnetic-enhancing element 2-SM2 corresponds to the second magnetic element 2-ME2 and is configured to adjust the magnetic field of the second magnetic element 2-ME2. The second magnetic-enhancing element 2-SM2 and the second magnetic element 2-ME2 are fixedly disposed in the second loading part 2-112, and the second magnetic-enhancing element 2-SM2 is fixedly connected to the second magnetic element 2-ME2 to adjust the magnetic field of the second magnetic element 2-ME2.

The second permeability element 2-CM2 has a metal material, and the second coil 2-CL2 is wound around the second permeability element 2-CM2. Specifically, the second fixed element 2-1062 is fixedly connected to the second permeability element 2-CM2, and the second coil 2-CL2 is wound around the second permeability element 2-CM2 and the second fixed element 2-1062. The second fixed element 2-1062 includes a plastic material.

As shown in FIG. 15, when viewed in the second direction 2-D2 which is parallel to the second surface 2-MS2, at least a part (the left part) of the second coil 2-CL2 is located between the second magnetic element 2-ME2 and the second permeability element 2-CM2.

When viewed in the second direction 2-D2, at least a part of the second fixed element 2-1062 is located between the second permeability element 2-CM2 and the second coil 2-CL2. When viewed in the second direction 2-D2, at least a part of the second fixed element 2-1062 is located between the second permeability element 2-CM2 and the second magnetic element 2-ME2.

Figure 16:
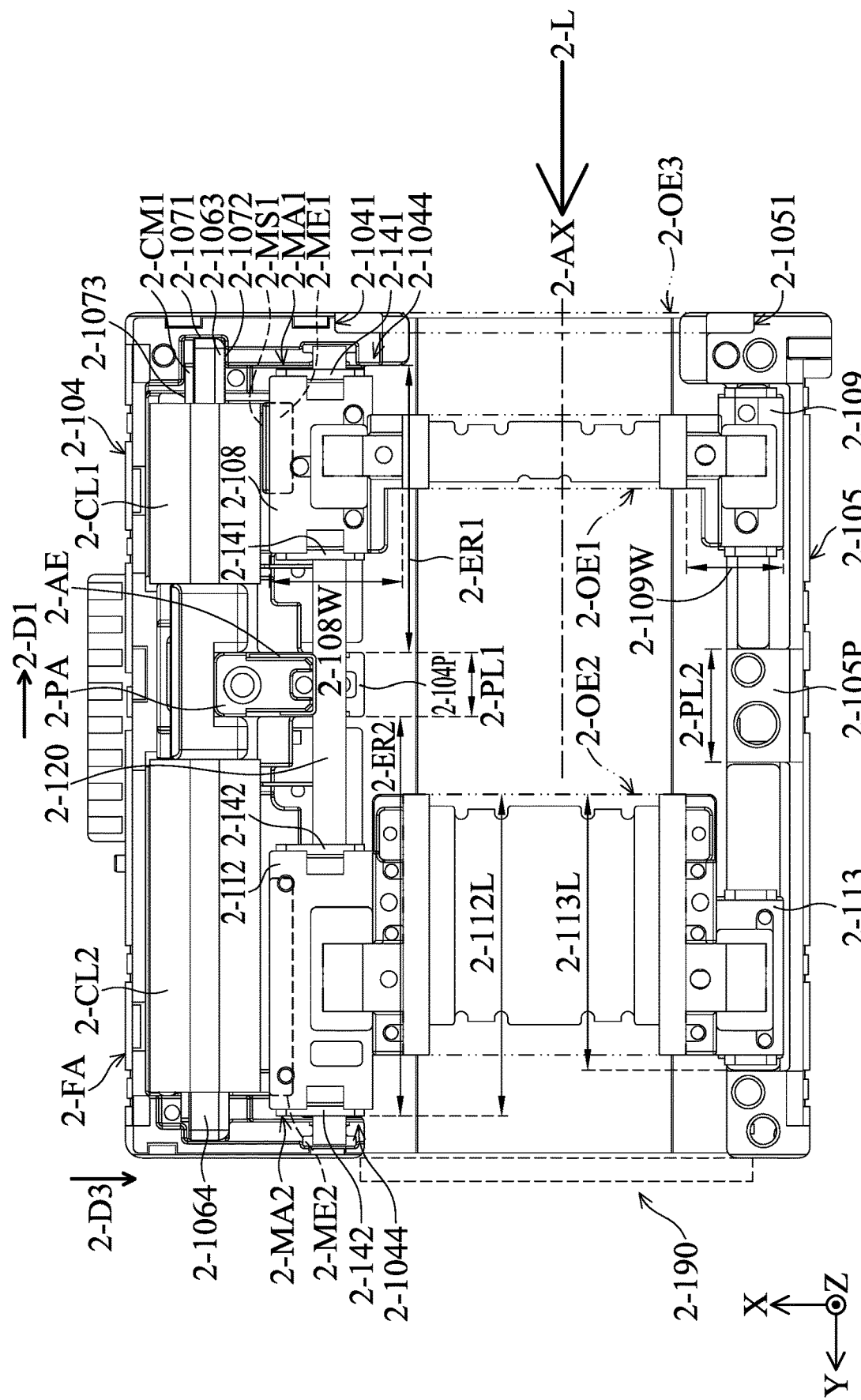
FIG. 16 is a top view of the optical element driving mechanism 2-100 according to an embodiment of the present disclosure.
Figure 17:
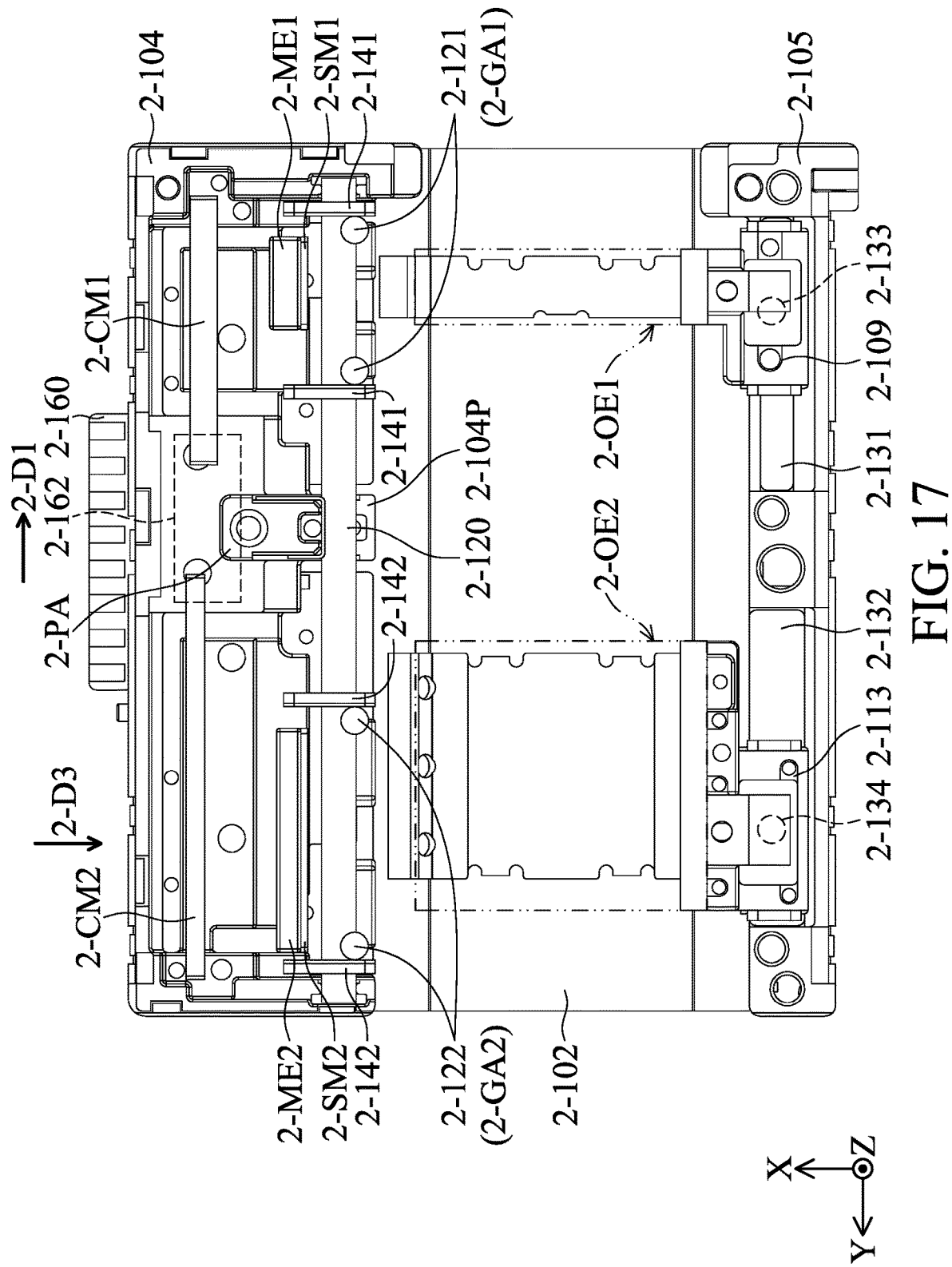
FIG. 17 is a top view of a partial structure of the optical element driving mechanism 2-100 according to an embodiment of the present disclosure.

Please refer to FIG. 16 and FIG. 17. FIG. 16 is a top view of the optical element driving mechanism 2-100 according to an embodiment of the present disclosure, and FIG. 17 is a top view of a partial structure of the optical element driving mechanism 2-100 according to an embodiment of the present disclosure. In this embodiment, the first movable assembly 2-MA1 is movable relative to the fixed assembly 2-FA in the first dimension within a first extreme range 2-ER1, and the second movable assembly 2-MA2 is movable relative to the fixed assembly 2-FA in the first dimension within a second extreme range 2-ER2.

The first extreme range 2-ER1 is different from the second extreme range 2-ER2. Specifically, the first extreme range 2-ER1 is smaller than the second extreme range 2-ER2.

As shown in FIG. 17, in the third direction 2-D3 which is perpendicular to the first surface 2-MS1, the minimum size of the first permeability element 2-CM1 is different from the minimum size of the second permeability element 2-CM2. In the third direction 2-D3, the minimum size of the first permeability element 2-CM1 is greater than the minimum size of the second permeability element 2-CM2.

In this embodiment, the thickness of the first permeability element 2-CM1 having a plate-shaped structure is different from the thickness of the second permeability element 2-CM2 having the plate-shaped structure. Specifically, the thickness of the first permeability element 2-CM1 is greater than the thickness of the second permeability element 2-CM2.

Furthermore, the shortest distance between the first magnetic element 2-ME1 and the first coil 2-CL1 is different from the shortest distance between the second magnetic element 2-ME2 and the second coil 2-CL2. Specifically, the shortest distance between the first magnetic element 2-ME1 and the first coil 2-CL1 is shorter than the shortest distance between the second magnetic element 2-ME2 and the second coil 2-CL2.

As shown in FIG. 17, in the third direction 2-D3, the maximum size of the first magnetic element 2-ME1 is different from the maximum size of the second magnetic element 2-ME2. Specifically, in the third direction 2-D3, the maximum size of the first magnetic element 2-ME1 is greater than the maximum size of the second magnetic element 2-ME2.

In the first direction 2-D1, the maximum size of the first magnetic element 2-ME1 is different from the maximum size of the second magnetic element 2-ME2.

Specifically, in the first direction 2-D1, the maximum size of the first magnetic element 2-ME1 is less than the maximum size of the second magnetic element 2-ME2.

When viewed in the first direction 2-D1, a surface of the first permeability element 2-CM1 perpendicular to the third direction 2-D3 (such as the upper surface in FIG. 17) overlaps at least a part of the second permeability element 2-CM2.

Based on the above structural configuration, the electromagnetic driving force and the attractive force between the magnetic element and the corresponding permeability element can be effectively adjusted, so that the first movable assembly 2-MA1 and the second movable assembly 2-MA2 within different moving ranges can maintain a good balance.

In this embodiment, the first fixed element 2-1061 and the second fixed element 2-1062 can form a fixed member 2-106. The second fixed element 2-1062 and the first fixed element 2-1061 have an integral structure. That is, they are not connected to each other by connecting means such as glue or welding.

In the first direction 2-D1, a first end portion 2-1063 of the fixed member 2-106 having an long strip-shaped structure is not in contact with the fixed assembly 2-FA. In the first direction 2-D1, a second end portion 2-1064 of the fixed member 2-106 is not in contact with the fixed assembly 2-FA, and the first end portion 2-1063 and the second end portion 2-1064 are arranged in the first direction 2-D1.

Figure 18:
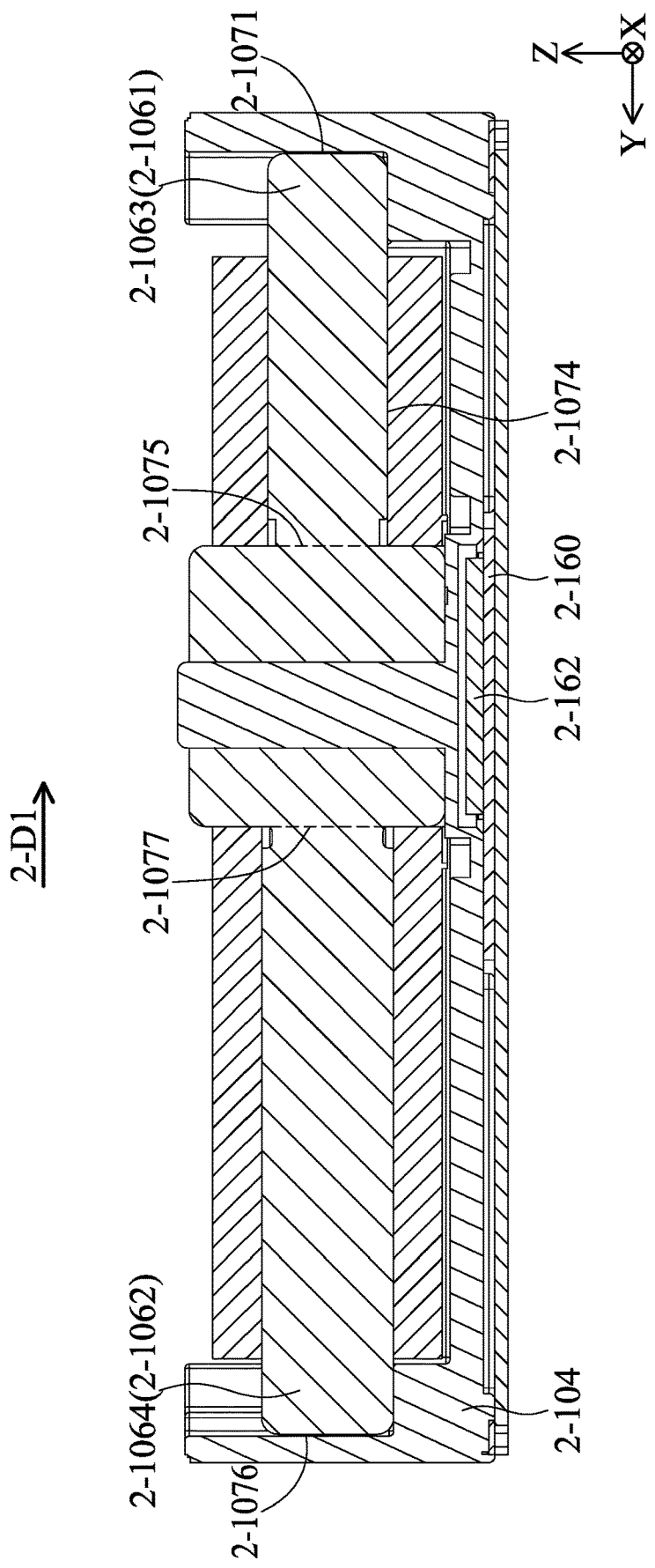
FIG. 18 is a cross-sectional view of the optical element driving mechanism 2-100 along the YZ plane according to an embodiment of the present disclosure.

Please refer to FIG. 16 and FIG. 18. FIG. 18 is a cross-sectional view of the optical element driving mechanism 2-100 along the YZ plane according to an embodiment of the present disclosure. As shown in FIG. 16 and FIG. 18, the fixed member 2-106 further includes a first fixed surface 2-1071, a second fixed surface 2-1072, a third fixed surface 2-1073, and a fourth fixed surface 2-1074, a fifth fixed surface 2-1075, a sixth fixed surface 2-1076, and a seventh fixed surface 2-1077.

The first fixed surface 2-1071 is located at the first end portion 2-1063 and is perpendicular to the first direction 2-D1. The second fixed surface 2-1072 is located at the first end portion 2-1063 and is parallel to the first surface 2-MS1. The third fixed surface 2-1073 is located at the first end portion 2-1063, and the second fixed surface 2-1072 and the third fixed surface 2-1073 face in opposite directions. The fourth fixed surface 2-1074 is located at the first end portion 2-1063 and is perpendicular to the first fixed surface 2-1071 and the second fixed surface 2-1072. The fifth fixed surface 2-1075 and the first fixed surface 2-1071 face in opposite directions.

The first fixed surface 2-1071 is located at the first fixed element 2-1061, the second fixed surface 2-1072 is located at the first fixed element 2-1061, the third fixed surface 2-1073 is located at the first permeability element 2-CM1, the fourth fixed surface 2-1074 is located at the first fixed element 2-1061, and the fifth fixed surface 2-1075 is located at the first fixed element 2-1061.

The sixth fixed surface 2-1076 is located at the second end portion 2-1064 and is perpendicular to the first direction 2-D1. The seventh fixed surface 2-1077 and the sixth fixed surface 2-1076 face the opposite directions. The sixth fixed surface 2-1076 is located at the second fixed element 2-1062, and the seventh fixed surface 2-1077 is located at the second fixed element 2-1062.

As shown in FIG. 16, in the first direction 2-D1, the shortest distance between the first fixed surface 2-1071 and the fixed assembly 2-FA is shorter than the shortest distance between the fifth fixed surface 2-1075 and the fixed assembly 2-FA. Specifically, the shortest distance between the first fixed surface 2-1071 and the base 2-104 in the first direction 2-D1 is not zero. That is, the first fixed surface 2-1071 does not contact the base 2-104.

In a direction that is perpendicular to the second fixed surface 2-1072, such as in the third direction 2-D3, the shortest distance between the second fixed surface 2-1072 and the fixed assembly 2-FA is greater than the shortest distance between third fixed surface 2-1073 and the fixed assembly 2-FA. For example, the third fixed surface 2-1073 contacts the base 2-104, but the second fixed surface 2-1072 does not contact the base 2-104.

Furthermore, the shortest distance between the first fixed surface 2-1071 and the fixed assembly 2-FA is greater than the shortest distance between the fourth fixed surface 2-1074 and the fixed assembly 2-FA. Specifically, the fourth fixed surface 2-1074 contacts the base 2-104, but the first fixed surface 2-1071 does not contact the base 2-104.

When viewed in the first direction 2-D1, the fifth fixed surface 2-1075 overlaps at least a part of the seventh fixed surface 2-1077. In the first direction 2-D1, the shortest distance between the sixth fixed surface 2-1076 and the fixed assembly 2-FA is shorter than the shortest distance between the seventh fixed surface 2-1077 and the fixed assembly 2-FA.

Based on the above structural design, the fixed member 2-106 can be accurately positioned on the base 2-104, and the overall structural strength can be increased.

Figure 19:
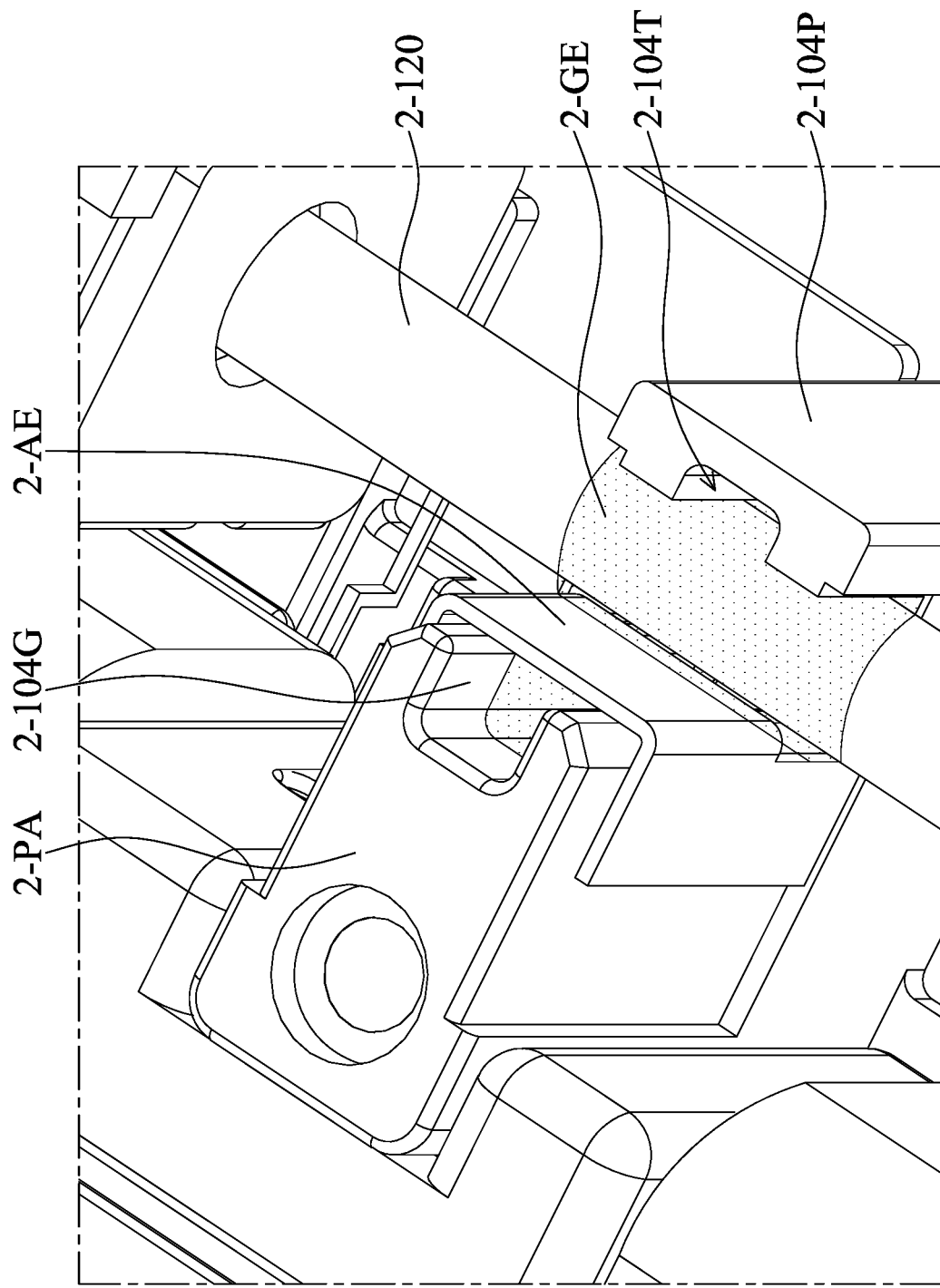
FIG. 19 is an enlarged view of the optical element driving mechanism 2-100 according to an embodiment of the present disclosure.

Please refer to FIG. 13, FIG. 16, and FIG. 19. FIG. 19 is an enlarged view of the optical element driving mechanism 2-100 according to an embodiment of the present disclosure. In this embodiment, the base 2-104 of the fixed assembly 2-FA further includes a positioning assembly 2-PA, which is configured to position the fixed member 2-106. The positioning assembly 2-PA has a protruding structure and extends along a direction (the Z-axis) perpendicular to the first direction 2-D1 and the third direction 2-D3.

Furthermore, the optical element driving mechanism 2-100 includes a magnetic-adjusting element 2-AE, located between the first loading part 2-108 and the second loading part 2-112, and is configured to adjust the magnetic force between the first magnetic element 2-ME1 and the second magnetic element 2-ME2 so as to avoid mutual magnetic interference between the first magnetic element 2-ME2 and the second magnetic element 2-ME2 to affect the movement of the first movable assembly 2-MA1 and the second movable assembly 2-MA2.

The magnetic-adjusting element 2-AE is fixedly disposed on the positioning assembly 2-PA, and the magnetic-adjusting element 2-AE may have a U-shaped structure. The magnetic-adjusting element 2-AE may have a metal material, for example, but it is not limited thereto.

Please continue to refer to FIG. 13 to FIG. 19. The optical element driving mechanism 2-100 further includes a guiding rod 2-120 configured to guide the first movable assembly 2-MA1 to move in the first direction 2-D1 relative to the fixed assembly 2-FA. The guiding rod 2-120 has an long strip-shaped structure extending in the first direction 2-D1. The guiding rod 2-120 passes through the first loading part 2-108 of the first movable assembly 2-MA1. When viewed in a fourth direction 2-D4 (the Z-axis) which is perpendicular to the first direction 2-D1 and the third direction 2-D3, the guiding rod 2-120 overlaps at least a part of the first movable assembly 2-MA1.

Similarly, the guiding rod 2-120 is configured to guide the second movable assembly 2-MA2 to move in the first direction 2-D1 relative to the fixed assembly 2-FA. The guiding rod 2-120 passes through the second loading part 2-112 of the second movable assembly 2-MA2. When viewed in the fourth direction 2-D4, the guiding rod 2-120 overlaps at least a part of the second movable assembly 2-MA2.

In this embodiment, the shortest distance between the first driving assembly 2-DA1 and the guiding rod 2-120 is the same as the shortest distance between the second driving assembly 2-DA2 and the guiding rod 2-120. For example, as shown in FIG. 16, the shortest distance between the first coil 2-CL1 and the guiding rod 2-120 is the same as the shortest distance between the second coil 2-CL2 and the guiding rod 2-120 (in the third direction 2-D3).

In addition, as shown in FIG. 17, the shortest distance between the first magnetic element 2-ME1 and the guiding rod 2-120 is the same as the shortest distance between the second magnetic element 2-ME2 and the guiding rod 2-120 (in the third direction 2-D3). Similarly, the shortest distance between the first magnetic-enhancing element 2-SM1 and the guiding rod 2-120 is the same as the shortest distance between the second magnetic-enhancing element 2-SM2 and the guiding rod 2-120 (in the third direction 2-D3).

As shown in FIG. 17, the shortest distance between the first permeability element 2-CM1 and the guiding rod 2-120 is different from the shortest distance between the second permeability element 2-CM2 and the guiding rod 2-120. Specifically, the shortest distance between the first permeability element 2-CM1 and the guiding rod 2-120 is shorter than the shortest distance between the second permeability element 2-CM2 and the guiding rod 2-120 (in the third direction 2-D3).

In this embodiment, the first loading part 2-108 is configured to load the first magnetic element 2-ME1, and the second loading part 2-112 is configured to load the second magnetic element 2-ME2. In addition, as shown in FIG. 16, the fixed assembly 2-FA further has a first blocking portion 2-104P disposed between the first loading part 2-108 and the second loading part 2-112. The first blocking portion 2-104P and the positioning assembly 2-PA are integrally formed in one piece.

The first blocking portion 2-104P is configured to block the first movable assembly 2-MA1 in the first extreme range 2-ER1, and the first blocking portion 2-104P is configured to block the second movable assembly 2-MA2 in the second extreme range 2-ER2. For example, when the first movable assembly 2-MA1 moves to the leftmost side of the first extreme range 2-ER1, the first movable assembly 2-MA1 contacts the first blocking portion 2-104P. In addition, when the second movable assembly 2-MA2 moves to the rightmost side of the second extreme range 2-ER2, the second movable assembly 2-MA2 contacts the first blocking portion 2-104P.

As shown in FIG. 16, FIG. 17, and FIG. 19, the guiding rod 2-120 passes through the first loading part 2-108, the first blocking portion 2-104P, and the second loading part 2-112, and the guiding rod 2-120 is fixedly disposed on the fixed assembly 2-FA. Specifically, a trench 2-104T and a groove 2-104G may be formed on the first blocking portion 2-104P, and they are communicated with each other. The guiding rod 2-120 is disposed in the trench 2-104T, and the magnetic-adjusting element 2-AE surrounds a part of the groove 2-104G. The optical element driving mechanism 2-100 may further include a gluing element 2-GE (such as glue), which flows into the groove 2-104G and then flows to the trench 2-104T, so that the magnetic-adjusting element 2-AE and the guiding rod 2-120 can be firmly affixed to the positioning assembly 2-PA and the first blocking portion 2-104P.

Based on the above structural configuration, the purpose of miniaturization can be achieved, and the overall balance can also be achieved.

In addition, as shown in FIG. 13, FIG. 17, and FIG. 18, the optical element driving mechanism 2-100 further includes a circuit assembly 2-160 and a control element 2-162. The circuit assembly 2-160 is, for example, a flexible circuit board, and the control element 2-162 is, for example, a control integrated circuit (IC), which is disposed on the circuit assembly 2-160.

The control element 2-162 is configured to control first driving assembly 2-DA1 to drive the movement of the first movable assembly 2-MA1 relative to the fixed assembly 2-FA, and the control element 2-162 is configured to control the second driving assembly 2-DA2 to drive The second movable assembly 2-MA2 moves relative to the fixed assembly 2-FA.

Figure 20:
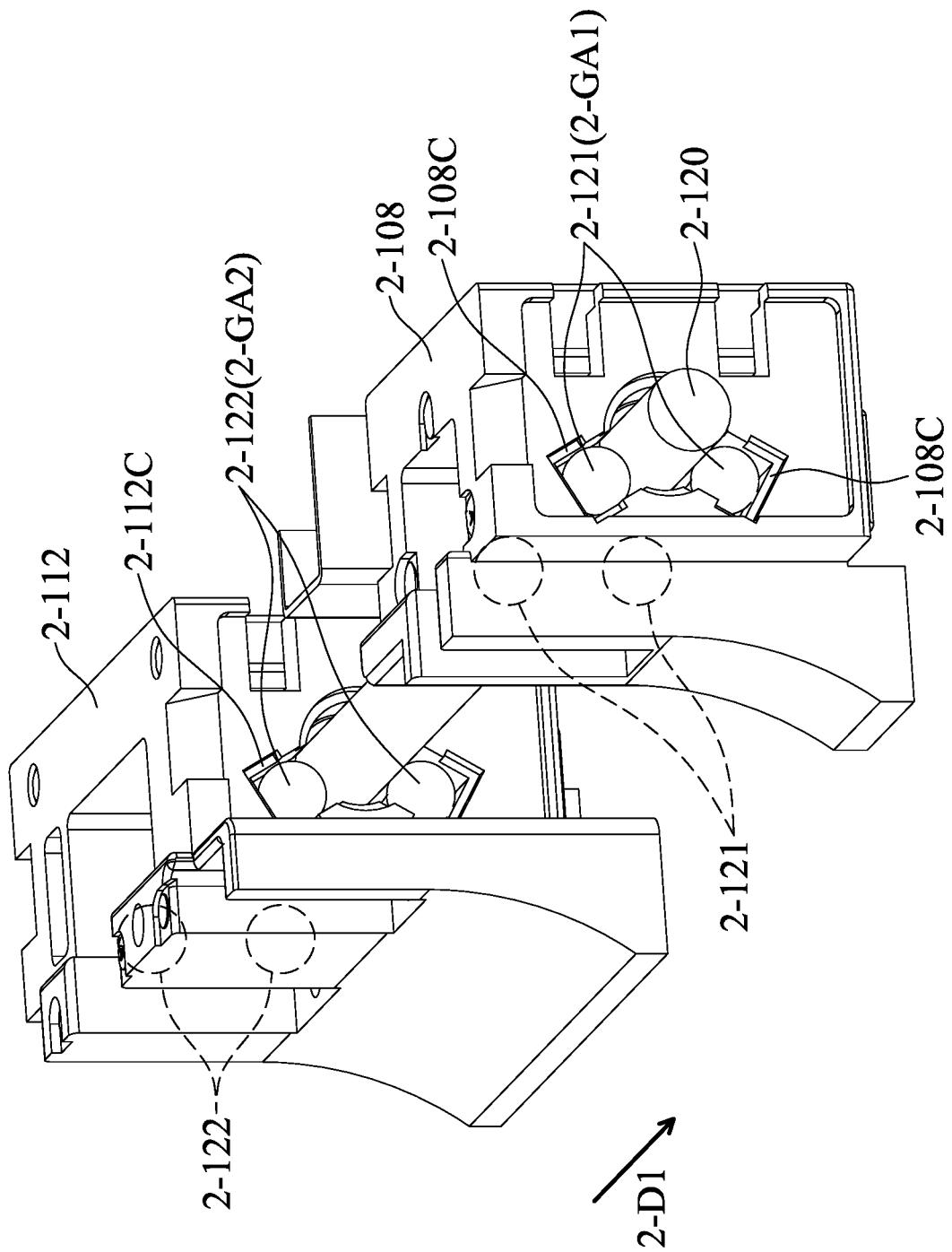
FIG. 20 is a perspective view of a partial structure of the optical element driving mechanism 2-100 according to an embodiment of the present disclosure.

Next, please refer to FIG. 13, FIG. 17, and FIG. 20. FIG. 20 is a perspective view of a partial structure of the optical element driving mechanism 2-100 according to an embodiment of the present disclosure. In this embodiment, the optical element driving mechanism 2-100 may further include a first guiding assembly 2-GA1, which is in direct contact with the guiding rod 2-120, and the first guiding assembly 2-GA1 includes at least two first guiding elements 2-121, disposed in the first loading part 2-108 of the first movable assembly 2-MA1. These first guiding elements 2-121 are configured to be in contact with the guiding rod 2-120.

When viewed in the first direction 2-D1 or the fourth direction 2-D4 (the Z-axis), the first magnetic element 2-ME1 is located between these first guiding elements 2-121 and the first permeability element 2-CM1. It is worth noting that, as shown in FIG. 14, when viewed in the first direction 2-D1 (the Y-axis), an included angle AG formed by the line connecting the centers of these first guiding elements 2-121 and the guiding rod 2-120 is greater than 0 degrees and less than 180 degrees.

In this embodiment, each of the first guiding elements 2-121 has a spherical structure, at least two first grooves 2-108C are formed in the first loading part 2-108 of the first movable assembly 2-MA1, and these first guiding elements 2-121 are respectively fixed in these first grooves 2-108C. Therefore, when the first loading part 2-108 of the first movable assembly 2-MA1 moves along the guiding rod 2-120, these first guiding elements 2-121 do not rotate relative to these first grooves 2-108C.

As shown in FIG. 17 and FIG. 20, in this embodiment, a plurality of first guiding assemblies 2-GA1 (for example, two first guiding assemblies 2-GA1) may be disposed in the first loading part 2-108 and may be arranged in the first direction 2-D1. Based on disposing two pairs of first guiding elements 2-121 on opposite sides of the first loading part 2-108, the stability of the first loading part 2-108 when moving can be ensured.

In addition, as shown in FIG. 14 and FIG. 20, the first loading part 2-108 contacts the guiding rod 2-120 only through these first guiding assemblies 2-GA1, and the first loading part 2-108 does not contact the guiding rod 2-120 directly. Specifically, as shown in FIG. 14, a magnetic attraction force is generated between the first magnetic element 2-ME1 and the first permeability element 2-CM1 to attract the first loading part 2-108 along the third direction 2-D3 toward the first fixed element 2-1061, so that the guiding rod 2-120 can reliably be in contact with the first guiding elements 2-121. Based on the above structural configuration, the stability of the first loading part 2-108 when moving in the first direction 2-D1 can be further ensured.

Similarly, the optical element driving mechanism 2-100 further includes a second guiding assembly 2-GA2, which is in direct contact with the guiding rod 2-120, and the second guiding assembly 2-GA2 includes at least two second guiding elements 2-122 disposed in the second loading part 2-112 of the second movable assembly 2-MA2. These second guiding elements 2-122 are configured to be in contact with the guiding rod 2-120.

When viewed in the first direction 2-D1 or the fourth direction 2-D4, the second magnetic element 2-ME2 is located between the two second guiding elements 2-122 and the second permeability element 2-CM2. It is worth noting that, as shown in FIG. 15, when viewed in the first direction 2-D1, the included angle formed by the line connecting the centers of the second guiding elements 2-122 and the guiding rod 2-120 is greater than 0 degrees and less than 180 degrees.

In this embodiment, each of these second guiding elements 2-122 has a spherical structure, at least two second grooves 2-112C are formed in the second loading part 2-112 of the second movable assembly 2-MA2, and these the second guiding element 2-122 are respectively fixed in the two second grooves 2-112C. Therefore, when the second loading part 2-112 of the second movable assembly 2-MA2 moves along the guiding rod 2-120, these second guiding elements 2-122 do not rotate relative to the second grooves 2-112C.

As shown in FIG. 17 and FIG. 20, in this embodiment, a plurality of second guiding assemblies 2-GA2 may be disposed in the second loading part 2-112 and may be arranged in the first direction 2-D1. Based on disposing two pairs of second guiding elements 2-122 on opposite sides of the second loading part 2-112, the stability of the second loading part 2-112 when moving can be ensured.

In addition, as shown in FIG. 15 and FIG. 20, the second loading part 2-112 contacts the guiding rod 2-120 only through these second guiding assemblies 2-GA2, and the second loading part 2-112 does not contact the guiding rod 2-120 directly. Similarly, based on the above structural configuration, the stability of the second loading part 2-112 when moving can be further ensured.

Figure 21:
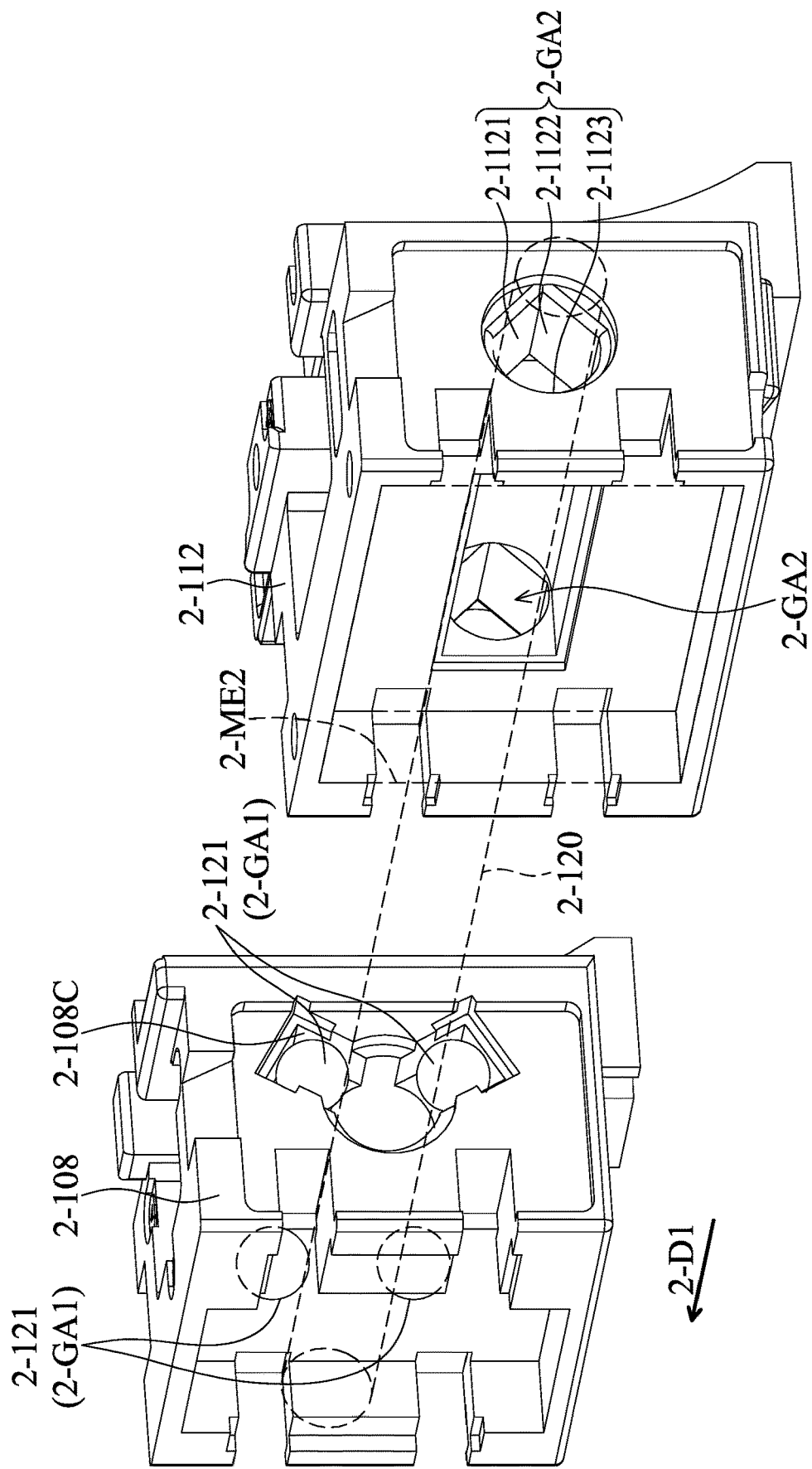
FIG. 21 is a perspective view of a partial structure of the optical element driving mechanism 2-100 according to another embodiment of the present disclosure.
Figure 22:
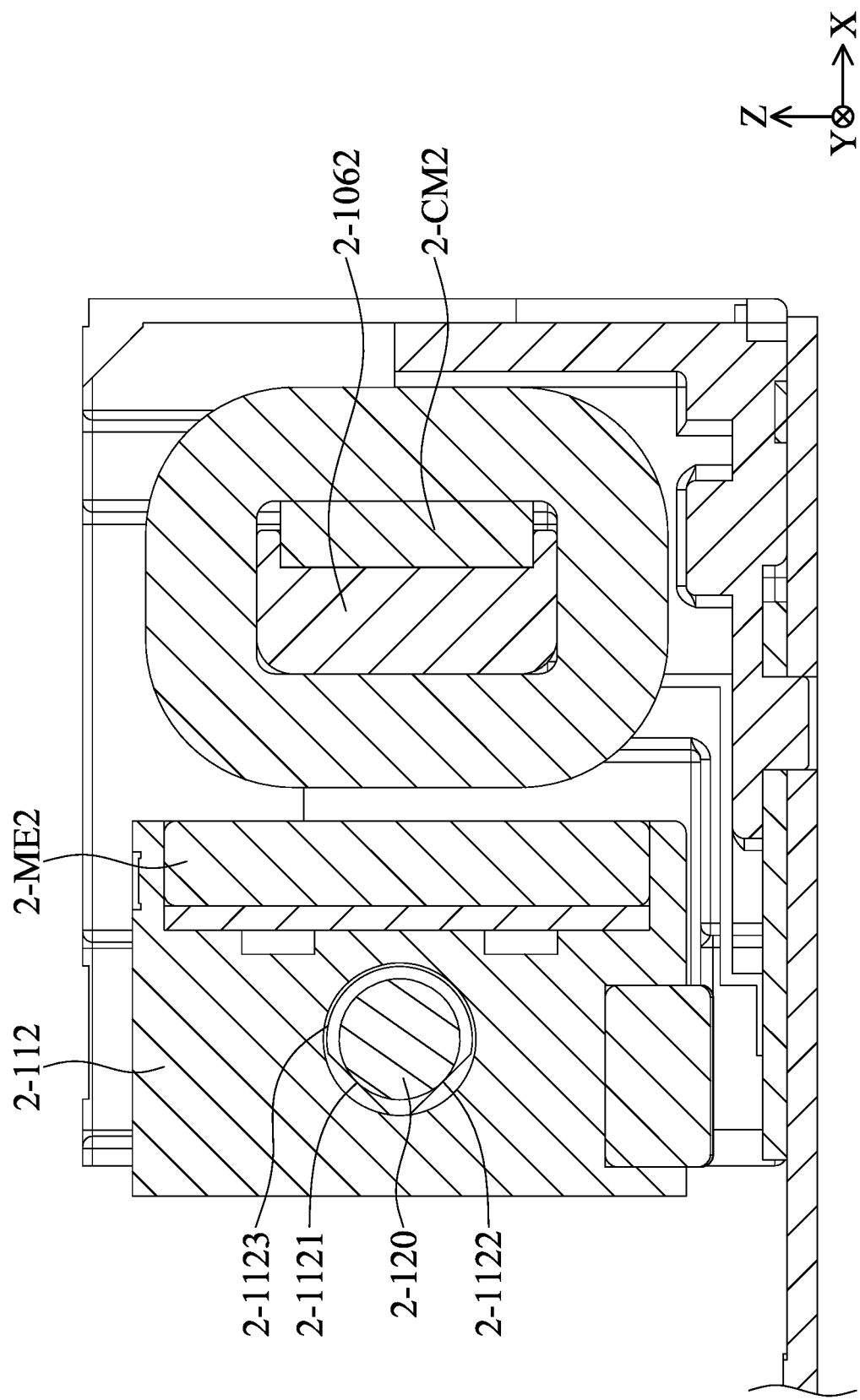
FIG. 22 is a cross-sectional view of the optical element driving mechanism 2-100 along the XZ plane according to another embodiment of to the present disclosure.

Next, please refer to FIG. 21 and FIG. 22. FIG. 21 is a perspective view of a partial structure of the optical element driving mechanism 2-100 according to another embodiment of the present disclosure, and FIG. 22 is a cross-sectional view of the optical element driving mechanism 2-100 along the XZ plane according to another embodiment of to the present disclosure. In this embodiment, the configurations of the first loading part 2-108, the first guiding assemblies 2-GA1, and the guiding rod 2-120 are the same as those in the previous embodiment, so they are not be repeated herein.

In this embodiment, the optical element driving mechanism 2-100 may further include at least one second guiding assembly 2-GA2, which is dispose in the second loading part 2-112, and the guiding rod 2-120 passes through the second guiding assembly 2-GA2. For example, the second guiding assembly 2-GA2 may be a through hole formed on the second loading part 2-112.

When viewed in the first direction 2-D1, the second guiding assembly 2-GA2 may include a first contacting slope 2-1121, a second contacting slope 2-1122, and a middle surface 2-1123. The middle surface 2-1123 is not parallel to the first contacting slope 2-1121 and the second contacting slope 2-1122, and the middle surface 2-1123 is connected to the first contacting slope 2-1121 and the second contacting slope 2-1122. In this embodiment, the middle surface 2-1123 may be an arc surface, but it is not limited thereto.

As shown in FIG. 22, when viewed in the first direction 2-D1, the second magnetic element 2-ME2 of the second driving assembly 2-DA2 is located between the first contacting slope 2-1121 and the second permeability element 2-CM2. The second magnetic element 2-ME2 and the second permeability element 2-CM2 can be collectively referred to as a second pressing assembly configured to generate a magnetic attraction force (or gravity or repulsive force) to attract the second loading part 2-112 toward the second fixed element 2-1062, so that the guiding rod 2-120 can reliably be in contact with the first contacting slope 2-1121 and the second contacting slope 2-1122. Specifically, the first contacting slope 2-1121 and the second contacting slope 2-1122 are configured to be in contact with the guiding rod 2-120.

In this embodiment, when viewed in the first direction 2-D1, the included angle between the first contacting slope 2-1121 and the second contacting slope 2-1122 may be greater than 45 degrees and less than 180 degrees.

Furthermore, as shown in FIG. 21, a plurality of second guiding assemblies 2-GA2 (the through holes) are disposed in the second loading part 2-112 and may be arranged in the first direction 2-D1. The second loading part 2-112 contacts the guiding rod 2-120 only through these second guiding assemblies 2-GA2. That is, the guiding rod 2-120 does not contact the middle surface 2-1123.

It is worth noting that dry lubricating oil or wet lubricating oil can be disposed on the guiding rod 2-120 to ensure that the first loading part 2-108 and the second loading part 2-112 can move along the guiding rod 2-120 smoothly.

In addition, it should be noted that the implementation of the first guiding assembly 2-GA1 and the second guiding assembly 2-GA2 is not limited to the above-mentioned embodiment. For example, the implementation of first guiding assembly 2-GA1 and that of the second guiding assembly 2-GA2 can be exchanged or the same. For example, both the first guiding assembly 2-GA1 and the second guiding assembly 2-GA2 may be through holes having the first contacting slope 2-1121, the second contacting slope 2-1122 and the middle surface 2-1123.

Figure 23:
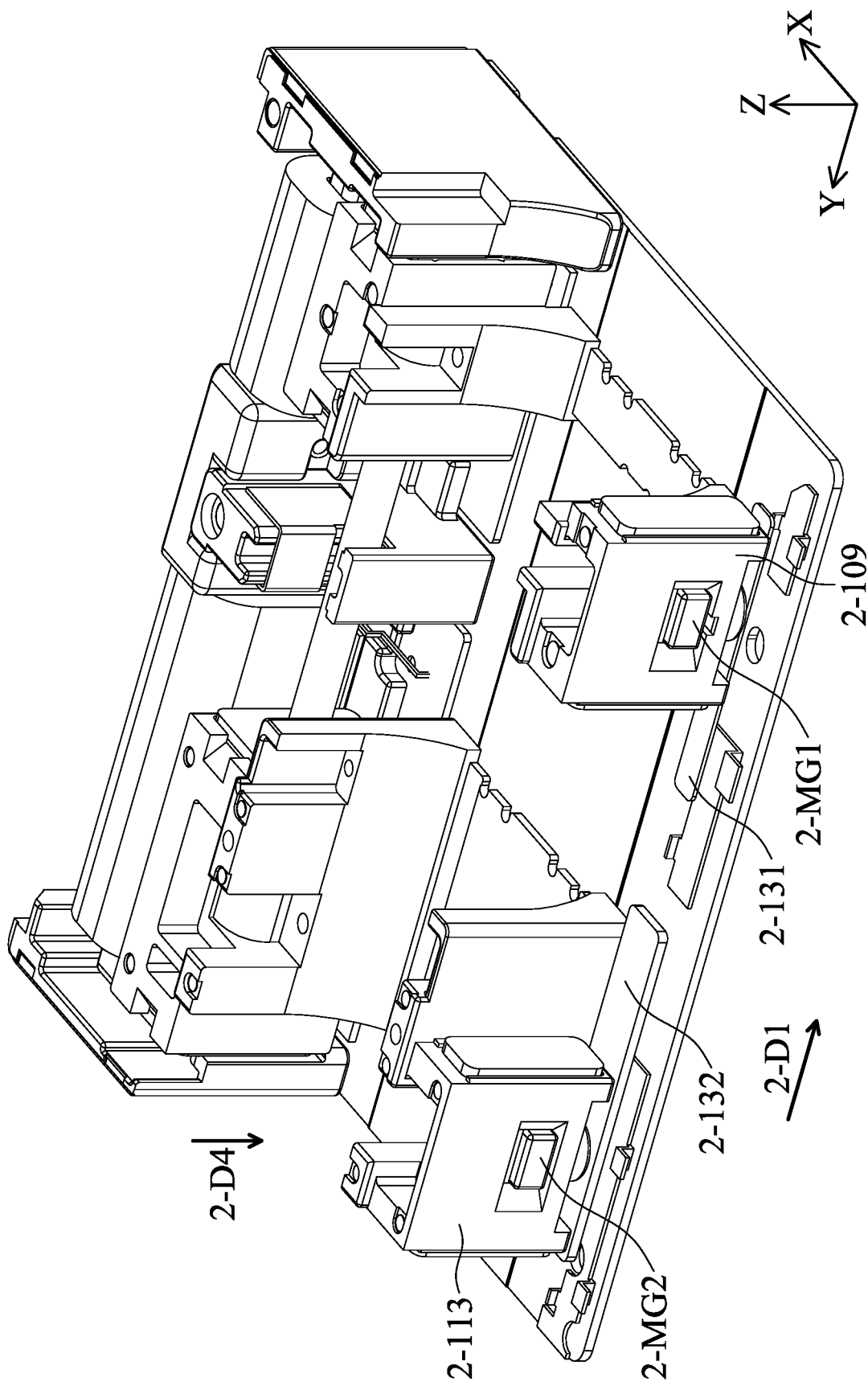
FIG. 23 is a perspective view of a partial structure of the optical element driving mechanism 2-100 according to an embodiment of the present disclosure.
Figure 24:
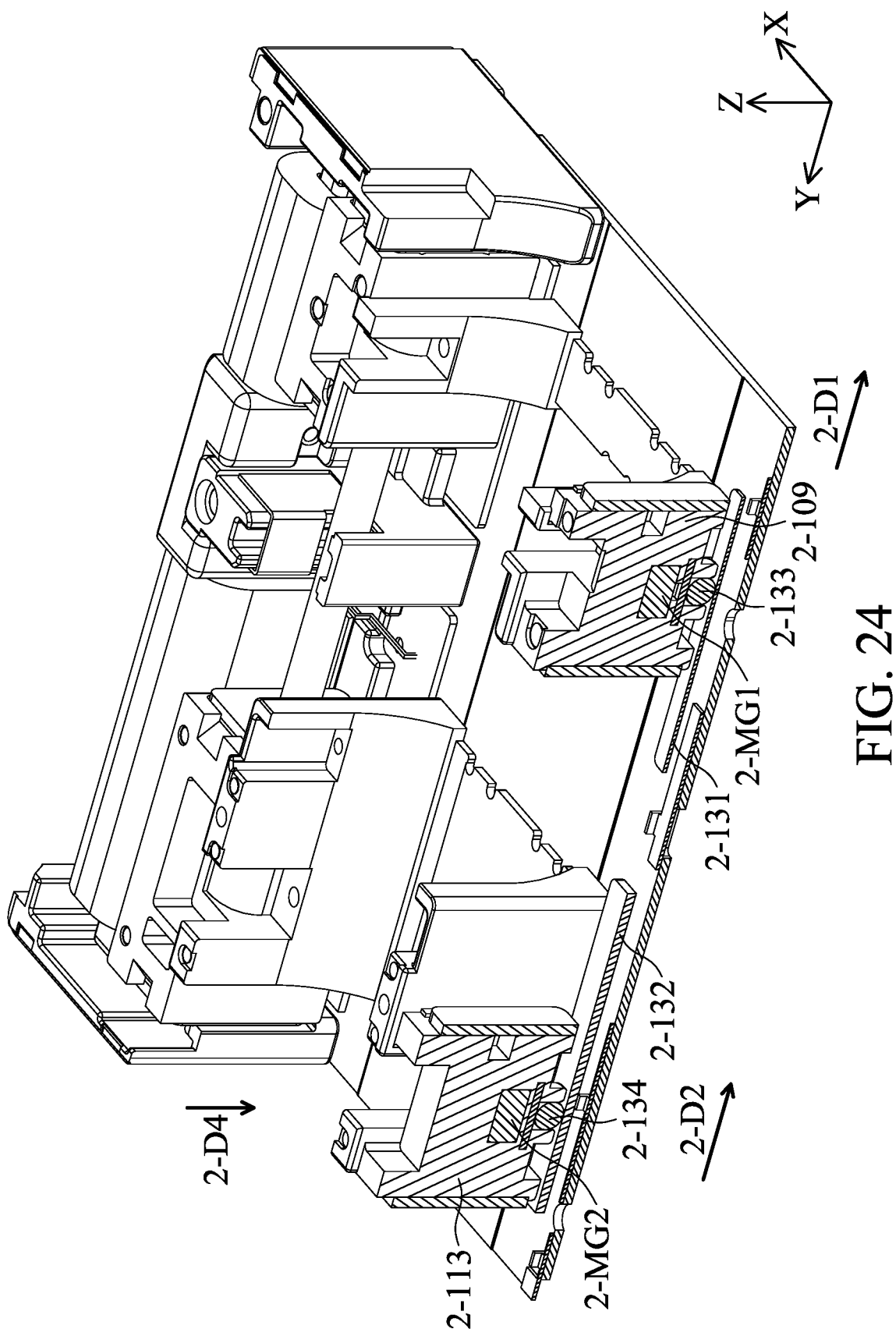
FIG. 24 is a cross-sectional view of the optical element driving mechanism 2-100 along the YZ plane according to an embodiment of the present disclosure.

Please refer to FIG. 17, FIG. 23, and FIG. 24. FIG. 23 is a perspective view of a partial structure of the optical element driving mechanism 2-100 according to an embodiment of the present disclosure, and FIG. 24 is a cross-sectional view of the optical element driving mechanism 2-100 along the YZ plane according to an embodiment of the present disclosure. The optical element driving mechanism 2-100 further includes a first guiding member 2-131 and a second guiding member 2-132 which are fixedly disposed on the frame 2-105 of the fixed assembly 2-FA.

The first guiding member 2-131 and the second guiding member 2-132 respectively correspond to the first sliding part 2-109 and the second sliding part 2-113, and the first guiding member 2-131 and the second guiding member 2-132 have a plate-shaped structure. As shown in FIG. 23 and FIG. 24, a first sliding member 2-133 and a first magnet 2-MG1 are disposed on the first sliding part 2-109.

When viewed in the first direction 2-D1, the first sliding member 2-133 is located between the first magnet 2-MG1 and the first guiding member 2-131. The first magnet 2-MG1 and the first guiding member 2-131 are configured to generate a first magnetic attraction force, so that the first sliding part 2-109 drives the first sliding member 2-133 to contact the first guiding member 2-131.

Similarly, a second sliding member 2-134 and a second magnet 2-MG2 are disposed on the second sliding part 2-113. When viewed in the second direction 2-D2, the second sliding member 2-134 is located between the second magnet 2-MG2 and the second guiding member 2-132.

The second magnet 2-MG2 and the second guiding member 2-132 are configured to generate a second magnetic attraction force, so that the second sliding part 2-113 drives the second sliding member 2-134 to contact the second guiding member 2-132. In this embodiment, the first sliding member 2-133 and the second sliding member 2-134 each have a spherical structure and can roll relative to the first sliding part 2-109 and the second sliding part 2-113, respectively.

Based on the above structural configuration, it can be ensured that the first sliding part 2-109 and the second sliding part 2-113 can stably move along the first guiding member 2-131 and the second guiding member 2-132, respectively.

In this embodiment, the length of the first guiding member 2-131 in the first direction 2-D1 (the Y-axis) is different from the length of the second guiding member 2-132 in the first direction 2-D1. For example, the length of the first guiding member 2-131 is smaller than the length of the second guiding member 2-132.

Furthermore, in the fourth direction 2-D4 perpendicular to the first direction 2-D1 and the third direction 2-D3, the size of the first guiding member 2-131 is different from the size of the second guiding member 2-132. Specifically, in the fourth direction 2-D4 (the Z-axis), the size (such as the thickness) of the first guiding member 2-131 is smaller than the size (such as thickness) of the second guiding member 2-132.

As shown in FIG. 17, when viewed in the fourth direction 2-D4 (the Z-axis), the center of the first guiding element 2-121 of the first guiding assembly 2-GA1 on the right side, the center of the first guiding element 2-121 of the first guiding assembly 2-GA1 on the left side, and the center of the first sliding member 2-133 form a triangular structure, which can surround the center of the first optical element 2-OE1.

Similarly, when viewed in the fourth direction 2-D4, the center of the second guiding element 2-122 of the second guiding assembly 2-GA2 on the right side, the center of the second guiding element 2-122 of the second guiding assembly 2-GA2 on the left side, and the center of the second sliding member 2-134 form a triangular structure, which can surround the center of the second optical element 2-OE2.

Please go back to FIG. 16 and FIG. 17. As shown in the figures, the optical element driving mechanism 2-100 further includes two first cushioning elements 2-141 disposed on opposite sides of the first loading part 2-108 along the first direction 2-D1. Furthermore, the optical element driving mechanism 2-100 may further include two second cushioning elements 2-142 disposed on opposite sides of the second loading part 2-112 along the first direction 2-D1.

These first cushioning elements 2-141 are configured to contact the first blocking portion 2-104P or a front side portion 2-1042 of the fixed assembly 2-FA when the first loading part 2-108 moves in the first extreme range 2-ER1, and these second cushioning elements 2-142 are configured to contact the first blocking portion 2-104P or a rear side portion 2-1044 of the fixed assembly 2-FA when the second loading part 2-112 moves in the second extreme range 2-ER2.

The first cushioning elements 2-141 and the second cushioning elements 2-142 can be made of sponge, rubber or a silicone material.

Similarly, the fixed assembly 2-FA further includes a second blocking portion 2-105P disposed between the first sliding part 2-109 and the second sliding part 2-113 and configured to block the first sliding part 2-109 and the second sliding part 2-113. In addition, cushioning elements can also be disposed on both sides of the first sliding part 2-109 and both sides of the second sliding part 2-113 to ensure that the first sliding part 2-109 and the second sliding part 2-113 are not damaged in collisions.

The maximum length 2-112L of the second loading part 2-112 in the first direction 2-D1 is greater than the maximum length 2-113L of the second sliding part 2-113 in the first direction 2-D1. In the third direction 2-D3, the maximum size 2-108W of the first loading part 2-108 is greater than the maximum size 2-109W of the first sliding part 2-109.

Furthermore, the length 2-PL1 of the first blocking portion 2-104P in the first direction 2-D1 is less than the length 2-PL2 of the second blocking portion 2-D1 in the first direction 2-D1. Based on the above structural design, the structural strength of the second blocking portion 2-105P can be increased to avoid damage caused by collision.

Please return to FIG. 16. In this embodiment, the optical element driving mechanism 2-100 may further include a third optical element 2-OE3, which is fixedly connected to the base 2-104. The third optical element 2-OE3 can be a lens configured to diffuse or converge a light beam 2-L. The base 2-104 has a concave structure 2-1041, corresponding to the third optical element 2-OE3.

Similarly, the third optical element 2-OE3 is fixedly connected to frame 2-105. Specifically, the frame 2-105 has a concave structure 2-1051, corresponding to the third optical element 2-OE3.

The light beam 2-L passes through the third optical element 2-OE3, the first optical element 2-OE1, and the second optical element 2-OE2 in sequence to be incident on a photosensitive assembly 2-190. The photosensitive assembly 2-190 may include a photosensitive element (not shown in the figures) configured to receive the light beam 2-L to generate a digital image signal. In this embodiment, the photosensitive assembly 2-190 can be affixed to the base 2-104, for example.

Figure 25:
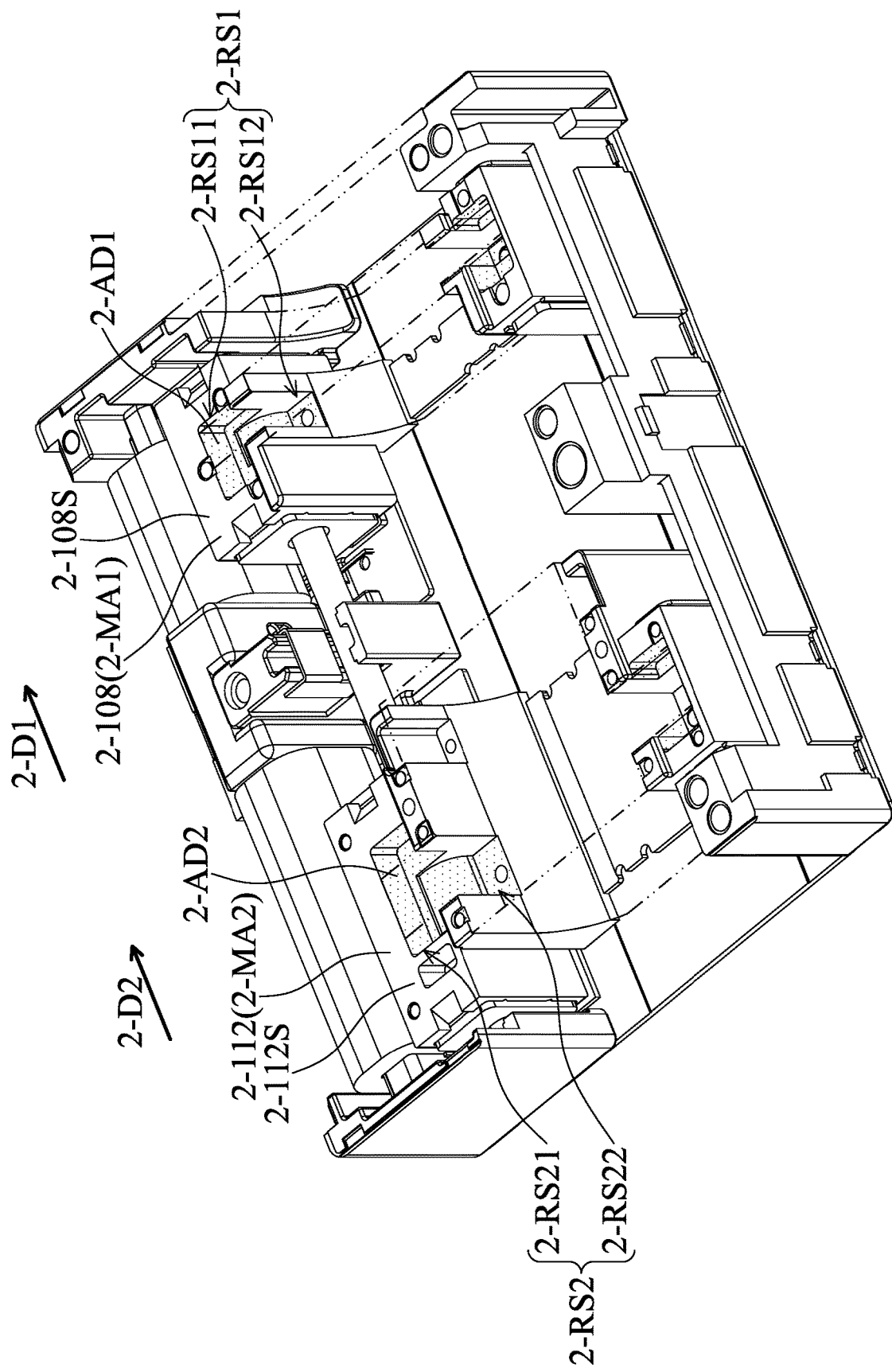
FIG. 25 is a schematic diagram of the optical element driving mechanism 2-100 in another view according to an embodiment of the present disclosure.

Next, please refer to FIG. 16 and FIG. 25, and FIG. 25 is a schematic diagram of the optical element driving mechanism 2-100 in another view according to an embodiment of the present disclosure. The third optical element 2-OE3, the first movable assembly 2-MA1, the second movable assembly 2-MA2, and the photosensitive assembly 2-190 are arranged in sequence along a main axis 2-AX.

In this embodiment, the first movable assembly 2-MA1 has a first receiving groove 2-RS1 corresponding to the first optical element 2-OE1, and the second movable assembly 2-MA2 has a second receiving groove 2-RS2 corresponding to the second optical element 2-OE2.

The first optical element 2-OE1 is affixed to the first receiving groove 2-RS1 by a first adhesive element 2-AD1. Specifically, the first adhesive element 2-AD1 is disposed in the first receiving groove 2-RS1, and the first receiving groove 2-RS1 is recessed from a first containing surface 2-108S of the first movable assembly 2-MA1.

The first receiving groove 2-RS1 further includes a first filling portion 2-RS11 and a first narrow portion 2-RS12, and in the first direction 2-D1, the maximum size of the first filling portion 2-RS11 is greater than that of the first narrow portion 2-RS12. The first narrow portion 2-RS12 is closer to the first optical element 2-OE1 than the first filling portion 2-RS11.

Similarly, the second optical element 2-OE2 is affixed to the second receiving groove 2-RS2 by a second adhesive element 2-AD2. Specifically, the second adhesive element 2-AD2 is disposed in the second receiving groove 2-RS2, and the second receiving groove 2-RS2 is recessed from a second containing surface 2-112S of the second movable assembly 2-MA2.

The second receiving groove 2-RS2 further includes a second filling portion 2-RS21 and a second narrow portion 2-RS22, and in the second direction 2-D2, the maximum size of the second filling portion 2-RS21 is greater than that of the second narrow portion 2-RS22.

In addition, in the first direction 2-D1, the maximum size of the first narrow portion 2-RS12 is less than the maximum size of the second narrow portion 2-RS22, and in the first direction 2-D1, the maximum size of the first filling portion 2-RS11 is smaller than the maximum size of the second filling portion 2-RS21.

Furthermore, in this embodiment, in the first direction 2-D1, the maximum size of the first optical element 2-OE1 is different from the maximum size of the second optical element 2-OE2. Specifically, in the first direction 2-D1, the maximum size of the first optical element 2-OE1 is smaller than the maximum size of the second optical element 2-OE2.

In summary, the present disclosure provides an optical element driving mechanism 2-100, including the first driving assembly 2-DA1 and the second driving assembly 2-DA2 configured to respectively drive the first movable assembly 2-MA1 and the second movable assembly 2-MA2 to move along the first dimension. The first movable assembly 2-MA1 and the second movable assembly 2-MA2 respectively hold the first optical element 2-OE1 and the second optical element 2-OE2, and the first movable assembly 2-MA1 and the second movable assembly 2-MA2 can be individually or cooperatively driven so as to achieve the function of optical zoom.

In addition, the optical element driving mechanism 2-100 may include a guiding rod 2-120 passing through the first movable assembly 2-MA1 and the second movable assembly 2-MA2, so that the first movable assembly 2-MA1 and the second movable assembly 2-MA2 can move steadily in the first direction 2-D1. In addition, the first driving assembly 2-DA1 includes the first permeability element 2-CM1 and the first magnetic element 2-ME1, the first permeability element 2-CM1 is affixed to the fixed member 2-106, and the first magnetic element 2-ME1 is affixed to the first movable assembly 2-MA1. Based on the magnetic attraction force between the first permeability element 2-CM1 and the first magnetic element 2-ME1, the stability of the first movable assembly 2-MA1 when moving along the guiding rod 2-120 can be further improved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
  a first movable assembly, configured to be connected to a first optical element;
  a fixed assembly, wherein the first movable assembly is movable relative to the fixed assembly;
  a first driving assembly, configured to drive the first movable assembly to move relative to the fixed assembly in a first dimension;

a second movable assembly, configured to be connected to a second optical element; and
a second driving assembly configured to drive the second movable assembly to move relative to the fixed assembly in the first dimension;
wherein the first movable assembly is movable relative to the fixed assembly in the first dimension within a first extreme range;
the second movable assembly is movable relative to the fixed assembly in the first dimension within a second extreme range;
the first extreme range is different from the second extreme range;
wherein the first driving assembly comprises:
a first coil;
a first permeability element, corresponding to the first coil;
a first magnetic element, corresponding to the first coil and configured to generate a first driving force, wherein the first magnetic element has a first surface which faces the first coil;
a first magnetic-enhancing element, corresponding to the first magnetic element and configured to adjust the magnetic field of the first magnetic element; and
a first fixed element, fixedly connected to the first permeability element;
wherein the first permeability element has a metal material;
the first coil is wound around the first permeability element;
the first magnetic-enhancing element is fixedly connected to the first magnetic element;
the first fixed element has a plastic material; and
wherein the first fixed element has a long strip-shaped structure, the first permeability element is fixedly connected to the first fixed element, and the first coil is wound around the first permeability element and the first fixed element.

2. The optical element driving mechanism as claimed in claim 1, wherein
when viewed in a first direction parallel to the first surface, at least a part of the first coil is located between the first magnetic element and the first permeability element;
when viewed in the first direction, at least a part of the first fixed element is located between the first permeability element and the first coil;
when viewed in the first direction, at least a part of the first fixed element is located between the first permeability element and the first magnetic element.

3. The optical element driving mechanism as claimed in claim 2, wherein
the second movable assembly is movable relative to the fixed assembly;
the first optical element comprises a lens;
the second optical element comprises a lens;
the second movable assembly is movable relative to the first movable assembly;
the second driving assembly is configured to drive the second movable assembly to move in a second dimension relative to the first movable assembly.

4. The optical element driving mechanism as claimed in claim 3, wherein
the second driving assembly comprises:
a second coil;
a second permeability element, corresponding to the second coil;
a second magnetic element, corresponding to the second coil and configured to generate a second driving force, wherein the second magnetic element has a second surface which faces the second coil;
a second magnetic-enhancing element, corresponding to the second magnetic element and configured to adjust the magnetic field of the second magnetic element; and
a second fixed element, fixedly connected to the second permeability element;
wherein the second magnetic-enhancing element is fixedly connected to the second magnetic element;
the second permeability element has a metal material;
the second coil is wound around the second permeability element;
the second fixed element has a plastic material;
when viewed in a second direction parallel to the second surface, at least a part of the second coil is located between the second magnetic element and the second permeability element;
when viewed in the second direction, at least a part of the second fixed element is located between the second permeability element and the second coil; and
when viewed in the second direction, at least a part of the second fixed element is located between the second permeability element and the second magnetic element.

5. The optical element driving mechanism as claimed in claim 4, wherein
the first extreme range is smaller than the second extreme range;
movement in the first dimension is a linear movement in the first direction;
movement in the second dimension is a linear movement in the second direction; and
the first direction is parallel to the second direction.

6. The optical element driving mechanism as claimed in claim 5, wherein
in a third direction perpendicular to the first surface, minimum sizes of the first permeability element and the second permeability element are different;
in the third direction, the minimum size of the first permeability element is greater than the minimum size of the second permeability element;
a shortest distance between the first magnetic element and the first coil is different from a shortest distance between the second magnetic element and the second coil; and
the shortest distance between the first magnetic element and the first coil is shorter than the shortest distance between the second magnetic element and the second coil.

7. The optical element driving mechanism as claimed in claim 6, wherein
in the third direction, a maximum size of the first magnetic element is different from a maximum size of the second magnetic element;
in the third direction, the maximum size of the first magnetic element is greater than the maximum size of the second magnetic element;
in the first direction, a maximum size of the first magnetic element is different from a maximum size of the second magnetic element; and
in the first direction, the maximum size of the first magnetic element is less than the maximum size of the second magnetic element.

8. The optical element driving mechanism as claimed in claim 7, wherein when viewed in the first direction, a surface of the first permeability element perpendicular to the third direction overlaps at least a part of the second permeability element;

the first fixed element and the second fixed element form a fixed member;

the second fixed element and the first fixed element have an integrally formed structure;

in the first direction, a first end portion of the fixed member having a long strip-shaped structure is not in contact with the fixed assembly; and in the first direction, a second end portion of the fixed member is not in contact with the fixed assembly, and the first end portion and the second end portion are arranged along the first direction.

9. The optical element driving mechanism as claimed in claim 8, wherein the fixed member comprises:

a first fixed surface, located at the first end portion and perpendicular to the first direction;

a second fixed surface, located at the first end portion and parallel to the first surface;

a third fixed surface, located at the first end portion, wherein the third fixed surface and the second fixed surface face in opposite directions;

a fourth fixed surface, located at the first end portion and perpendicular to the first fixed surface and the second fixed surface;

a fifth fixed surface, wherein the fifth fixed surface and the first fixed surface face in opposite directions;

a sixth fixed surface, located at the second end portion and perpendicular to the first direction; and a seventh fixed surface, wherein the seventh fixed surface and the sixth fixed surface face in opposite directions;

wherein the first fixed surface is located at the first fixed element;

the second fixed surface is located at the first fixed element;

the third fixed surface is located at the first permeability element;

the fourth fixed surface is located at the first fixed element;

the fifth fixed surface is located at the first fixed element;

the sixth fixed surface is located at the second fixed element;

the seventh fixed surface is located at the second fixed element; and in the first direction, a shortest distance between the first fixed surface and the fixed assembly is shorter than a shortest distance between the fifth fixed surface and the fixed assembly.

10. The optical element driving mechanism as claimed in claim 9, wherein in a direction perpendicular to the second fixed surface, a shortest distance between the second fixed surface and the fixed assembly is greater than a shortest distance between the third fixed surface and the fixed assembly;

the shortest distance between the first fixed surface and the fixed assembly is greater than a shortest distance between the fourth fixed surface and the fixed assembly;

when viewed in the first direction, the fifth fixed surface overlaps at least a part of the seventh fixed surface; and in the first direction, a shortest distance between the sixth fixed surface and the fixed assembly is shorter than a shortest distance between the seventh fixed surface and the fixed assembly.

11. The optical element driving mechanism as claimed in claim 10, wherein the fixed assembly further includes a positioning assembly configured to position the fixed member;

the positioning assembly has a protruding structure and extends in a direction perpendicular to the first direction and the third direction;

the optical element driving mechanism further includes a magnetic-adjusting element configured to adjust magnetic force between the first magnetic element and the second magnetic element to avoid mutual magnetic interference between the first magnetic element and the second magnetic element to affect movement of the first movable assembly and the second movable assembly;

the magnetic-adjusting element is fixedly disposed on the positioning assembly; and the magnetic-adjusting element has a U-shaped structure.

12. The optical element driving mechanism as claimed in claim 11, wherein the optical element driving mechanism further includes a first guiding assembly configured to guide the first movable assembly to move in the first direction relative to the fixed assembly;

the first guiding assembly includes a guiding rod having a long strip-shaped structure extending in the first direction;

the guiding rod passes through the first movable assembly;

when viewed in a fourth direction perpendicular to the first direction and the third direction, the guiding rod overlaps at least a part of the first movable assembly;

the first guiding assembly is configured to guide the second movable assembly to move in the first direction relative to the fixed assembly;

the guiding rod passes through the second movable assembly;

when viewed in the fourth direction, the guiding rod overlaps at least a part of the second movable assembly;

a shortest distance between the first driving assembly and the guiding rod is the same as a shortest distance between the second driving assembly and the guiding rod;

a shortest distance between the first coil and the guiding rod is the same as a shortest distance between the second coil and the guiding rod;

a shortest distance between the first magnetic element and the guiding rod is the same as a shortest distance between the second magnetic element and the guiding rod;

a shortest distance between the first magnetic-enhancing element and the guiding rod is the same as a shortest distance between the second magnetic-enhancing element and the guiding rod;

a shortest distance between the first permeability element and the guiding rod is different from a shortest distance between the second permeability element and the guiding rod; and the shortest distance between the first permeability element and the guiding rod is shorter than a shortest distance between the second permeability element and the guiding rod.

13. The optical element driving mechanism as claimed in claim 12, wherein the optical element driving mechanism further comprises a sensing assembly electrically connected to the first driving assembly, and the sensing assembly comprises:

a first reference element, having a long strip-shaped structure;
a first sensing element, corresponding to the first reference element and configured to sense movement of the first movable assembly relative to the fixed assembly;
a second reference element, having a long strip-shaped structure;
a third reference element, having a long strip-shaped structure;
a fourth reference element, having a long strip-shaped structure; and
a second sensing element, corresponding to the third reference element and configured to sense movement of the second movable assembly relative to the fixed assembly;
wherein the extension directions of the first reference element and the second reference element are not parallel; and
a length of the first reference element is the same as a length of the second reference element.

14. The optical element driving mechanism as claimed in claim 13, wherein
when viewed in the first direction, the first reference element overlaps at least a part of the second reference element;
when viewed in the first direction, the first reference element does not overlap the first sensing element;
when viewed in the fourth direction, the first reference element overlaps at least a part of the guiding rod;
when viewed in the fourth direction, the first sensing element overlaps at least a part of the guiding rod; and
when viewed in the fourth direction, the first driving assembly does not overlap the guiding rod.

15. The optical element driving mechanism as claimed in claim 14, wherein
the extension directions of the third reference element and the fourth reference element are not parallel;
a length of the third reference element is the same as a length of the fourth reference element;
the length of the first reference element is different from the length of the third reference element;
the length of the first reference element is less than the length of the third reference element;
when viewed in the first direction, the third reference element overlaps at least a part of the fourth reference element;
when viewed in the first direction, the third reference element does not overlap the second sensing element;
when viewed in the fourth direction, the third reference element overlaps at least a part of the guiding rod;
when viewed in the fourth direction, the second sensing element overlaps at least a part of the guiding rod; and
when viewed in the fourth direction, the second driving assembly does not overlap the guiding rod.

16. The optical element driving mechanism as claimed in claim 15, wherein
the optical element driving mechanism further includes a control element configured to control the first driving assembly to drive the first movable assembly to move relative to the fixed assembly;
the control element is configured to control the second driving assembly to drive the second movable assembly to move relative to the fixed assembly;
the control element is electrically connected to the first sensing element;
the control element is electrically connected to the second sensing element;
when viewed in the fourth direction, the control element is located between the first driving assembly and the second driving assembly;
when viewed in the fourth direction, the control element is located between the first coil and the second coil;
when viewed in the fourth direction, the control element is located between the first permeability element and the second permeability element;
when viewed in the fourth direction, the first permeability element overlaps at least a part of the control element;
when viewed in the fourth direction, the second permeability element overlaps at least a part of the control element;
when viewed in the fourth direction, the control element overlaps at least a part of the positioning assembly;
the optical element driving mechanism further includes a circuit assembly electrically connected to the first sensing element;
the circuit assembly has a plate-shaped structure;
the first sensing element is electrically connected to the control element via the circuit assembly; and
the control element is electrically connected to the first driving assembly via the circuit assembly.

17. The optical element driving mechanism as claimed in claim 16, wherein the fixed assembly comprises:
a bottom plate, having a plate-shaped structure; and
a base;
wherein the base is fixedly disposed on the bottom plate;
the bottom plate includes a metal;
the base includes a plastic material;
at least a part of the first driving assembly is fixedly disposed on the base;
the fixed member is fixedly disposed on the base;
a permeability of the bottom plate is less than a permeability of the first permeability element;
the base and the positioning assembly are integrally formed in one piece;
a notch is formed on the base and is configured to accommodate the control element;
when viewed in the fourth direction, the base does not overlap the first sensing element;
when viewed in the fourth direction, the base overlaps at least a part of the control element; and
the circuit assembly is disposed between the base and the bottom plate.

18. The optical element driving mechanism as claimed in claim 17, wherein the fixed assembly further comprises:
an outer frame, having a top surface and a side surface, having a plate-shaped structure, and the top surface is not parallel to the side surface; and
a frame, fixedly disposed on the bottom plate;
wherein the outer frame has a metal material;
the frame has a plastic material;
the optical element driving mechanism further comprises a third optical element, fixedly connected to the base;
the third optical element has a lens to diffuse or converge a light beam;
the base has a convex structure, corresponding to the third optical element;
the third optical element is fixedly connected to the frame;
the frame has a convex structure, corresponding to the third optical element; and
the light beam is incident on a photosensitive assembly through the first optical element, the second optical element, and the third optical element, and the photosensitive assembly includes a photosensitive element.

19. The optical element driving mechanism as claimed in claim 18, wherein the optical element driving mechanism is configured to correspond to and be adjacent to an optical system;
- when viewed in the fourth direction, the optical element driving mechanism has a polygonal structure;
- when viewed in the fourth direction, the light beam enters from a first side of the optical element driving mechanism and exits from a second side, and the first side and the second side are parallel to each other;
- when viewed in the fourth direction, the first driving assembly is located at a third side of the optical element driving mechanism;
- when viewed in the fourth direction, the second driving assembly is located at the third side;
- when viewed in the fourth direction, the first sensing element is located at the third side;
- when viewed in the fourth direction, the second sensing element is located at the third side;
- when viewed in the fourth direction, a distance between an optical axis of the first optical element and a boundary of the third side is greater than a distance between the optical axis and a boundary of the fourth side of the optical element driving mechanism;
- the third side is parallel to the optical axis;
- the third side and the fourth side are parallel to each other;
- when viewed in the fourth direction, there is no electromagnetic driving assembly disposed on the fourth side; and
- when viewed in the fourth direction, the optical system is located at the fourth side.

* * * * *